(12) United States Patent
Rofougaran

(10) Patent No.: US 7,957,457 B2
(45) Date of Patent: *Jun. 7, 2011

(54) VOICE DATA RF WIRELESS NETWORK IC

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 1049 days.

This patent is subject to a terminal disclaimer.

(21) Appl. No.: 11/711,126

(22) Filed: Feb. 26, 2007

(65) Prior Publication Data

US 2008/0146270 A1 Jun. 19, 2008

Related U.S. Application Data

(63) Continuation-in-part of application No. 11/641,999, filed on Dec. 19, 2006.

(51) Int. Cl.
*H04B 1/38* (2006.01)
*H04L 5/16* (2006.01)

(52) U.S. Cl. ........ 375/222; 375/219; 375/220; 375/295; 375/316; 379/88.13; 370/435; 370/314; 370/345; 455/466; 455/446; 455/553.1

(58) Field of Classification Search .............. 375/222, 375/219, 220, 295, 316; 379/88.13; 370/314, 370/345, 435; 455/553.1, 466, 446

See application file for complete search history.

(56) References Cited

U.S. PATENT DOCUMENTS

| 7,069,211 B2 * | 6/2006 | Chiu et al. .................. 704/221 |
| 2003/0067894 A1 | 4/2003 | Schmidt |
| 2005/0245292 A1 | 11/2005 | Bennett |
| 2005/0262278 A1 | 11/2005 | Schmidt |
| 2006/0052124 A1 | 3/2006 | Pottenger |

FOREIGN PATENT DOCUMENTS

EP 1335544 A2 8/2003

(Continued)

OTHER PUBLICATIONS

GSM "LoCosto", Texas Instruments, Technology for Innovators, pp. 1-2.

(Continued)

*Primary Examiner* — Phuong Phu
(74) *Attorney, Agent, or Firm* — Garlick Harrison & Markison; Timothy W. Markison; Shayne X. Short

(57) ABSTRACT

An integrated circuit (IC) includes at least one baseband processing module, an RF section, and an interface. The baseband processing module converts outbound voice signal into an outbound voice symbol stream; an inbound voice symbol stream into an inbound voice signal; outbound data into an outbound data symbol stream; an inbound data symbol stream into inbound data; outbound wireless network data into an outbound wireless network data symbol stream; and an inbound wireless network data symbol stream into inbound wireless network data. The RF section converts an inbound RF voice signal into the inbound voice symbol stream; the outbound voice symbol stream into an outbound RF voice signal; an inbound RF data signal into the inbound data symbol stream; the outbound data symbol stream into an outbound RF data signal; an inbound RF wireless network data signal into the inbound wireless network data symbol stream; and the outbound wireless network data symbol stream into an outbound RF wireless network data signal. The interface module couples the baseband processing module(s) to the RF section.

23 Claims, 13 Drawing Sheets

FOREIGN PATENT DOCUMENTS

EP      1727291 A2    11/2006

OTHER PUBLICATIONS

Edge/GPRS/GSM Single-Chip Multimedia Baseband Processor, BCM2133, Product Brief, Broadcom Corporation, 2133-PB07-D1, Nov. 30, 2006, pp. 1-2.

WCDMA Baseband Coprocessor, BCM2141, Product Brief, Broadcom Corporation, 2141-PB03-R, Dec. 1, 2006, pp. 1-2.

Hedge Single-Chip Multimedia Baseband Processor, BCM2152, Product Brief, Broadcom Corporation, 2152-PB04-R, Dec. 1, 2006, pp. 1-2.

Andrew Fogg: DigRF Baseband/RF Digital Interface Specification; Logical, Electrical and Timing Characteristics, EGPRS Version, Digital Interface Working Group, version 1.12, pp. 1-32.

Molecular Expressions Optical Microscopy Primer: Digital Imaging in Optical Microscopy, pp. 1-13.

European Search Report; EP07019340.4-2411, dated Apr. 7, 2011.

* cited by examiner

VOICE DATA RF WIRELESS NETWORK IC

This patent application is claiming priority under 35 USC §120 as a continuation-in-part patent application of co-pending patent application entitled VOICE/DATA/RF INTEGRATED CIRCUIT, having a filing date of Dec. 19, 2006, and a Ser. No. of 11/641,999.

CROSS REFERENCE TO RELATED PATENTS—NOT APPLICABLE

STATEMENT REGARDING FEDERALLY SPONSORED RESEARCH OR DEVELOPMENT—NOT APPLICABLE

INCORPORATION-BY-REFERENCE OF MATERIAL SUBMITTED ON A COMPACT DISC—NOT APPLICABLE

BACKGROUND OF THE INVENTION

1. Technical Field of the Invention

This invention relates generally to wireless communication systems and more particularly to integrated circuits of transceivers operating within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. However, such desires have gone unrealized when it comes to implementing baseband and RF on the same chip for multiple wireless communication standards.

Therefore, a need exists for an integrated circuit (IC) that implements baseband and RF of multiple wireless communication standards on the same IC die.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
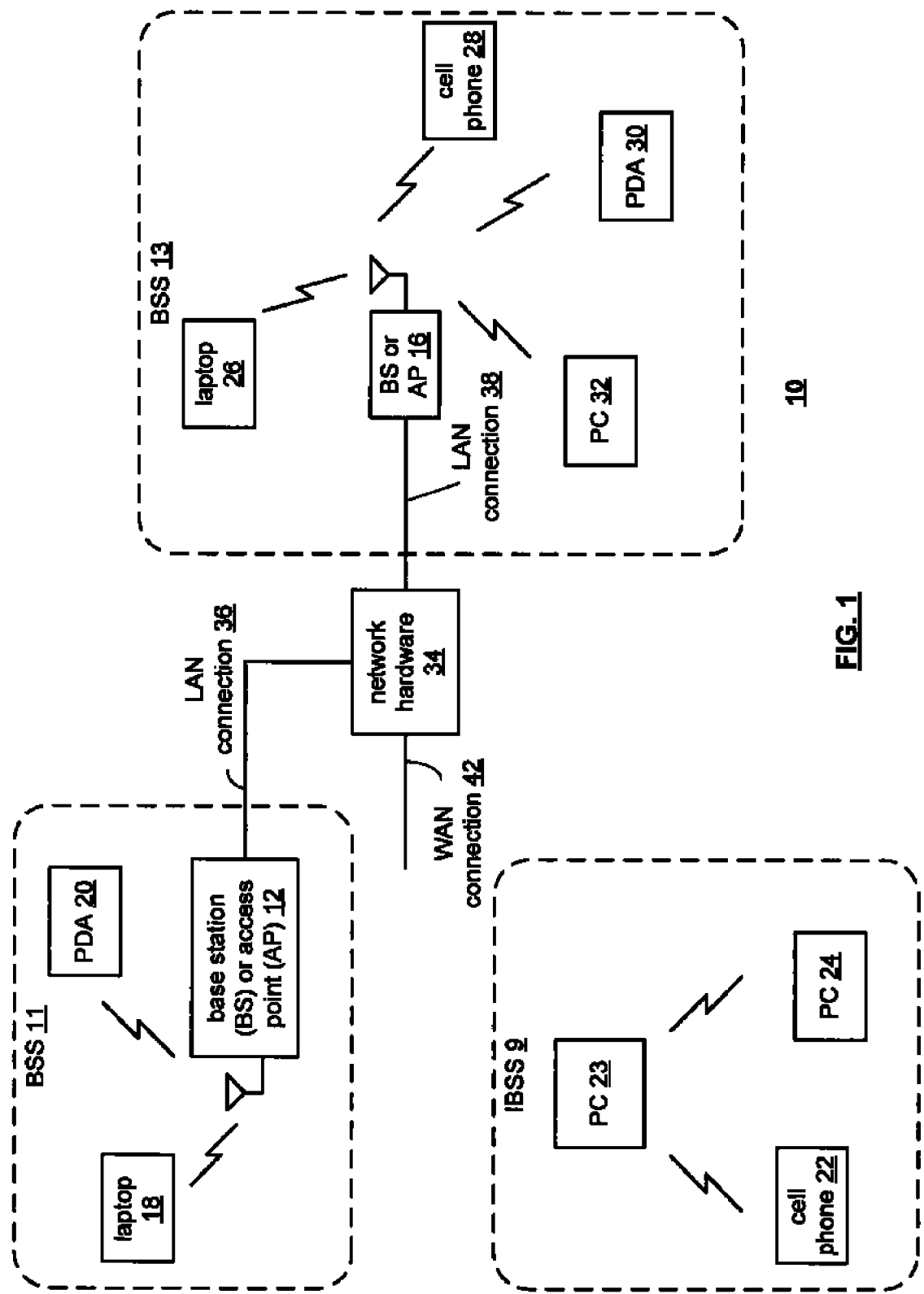
FIG. 1 is a schematic block diagram of an embodiment of a wireless communication system in accordance with the present invention.

FIG. 1 is a schematic block diagram of a wireless communication environment that includes a communication device 10 communicating with one or more of a wireline non-real-time device 12, a wireline real-time device 14, a wireline non-real-time and/or real-time device 16, a base station 18, a wireless non-real-time device 20, a wireless real-time device 22, and a wireless non-real-time and/or real-time device 24. The communication device 10, which may be a personal computer, laptop computer, personal entertainment device, cellular telephone, personal digital assistant, a game console, a game controller, and/or any other type of device that communicates real-time and/or non-real-time signals, may be coupled to one or more of the wireline non-real-time device 12, the wireline real-time device 14, and the wireline non-real-time and/or real-time device 16 via a wireless connection 28. The wireless connection 28 may be an Ethernet connection, a universal serial bus (USB) connection, a parallel connection (e.g., RS232), a serial connection, a fire-wire connection, a digital subscriber loop (DSL) connection, and/or any other type of connection for conveying data.

The communication device 10 communicates RF non-real-time data 25 and/or RF real-time data 26 with one or more of the base station 18, the wireless non-real-time device 20, the wireless real-time device 22, and the wireless non-real-time and/or real-time device 24 via one or more channels in a frequency band ($fb_A$) that is designated for wireless communications. For example, the frequency band may be 900 Hz, 1800 MHz, 1900 MHz, 2100 MHz, 2.4 GHz, 5 GHz, any ISM (industrial, scientific, and medical) frequency bands, and/or any other unlicensed frequency band in the United States and/or other countries. As a particular example, wideband code division multiple access (WCDMA) utilizes an uplink frequency band of 1920-1980 MHz and a downlink frequency band of 2110-2170 MHz. As another particular example, EDGE, GSM and GPRS utilize an uplink transmission frequency band of 890-915 MHz and a downlink transmission band of 935-960 MHz. As yet another particular example, IEEE 802.11(g) utilizes a frequency band of 2.4 GHz frequency band.

The wireless real-time device 22 and the wireline real-time device 14 communicate real-time data that, if interrupted, would result in a noticeable adverse affect. For example, real-time data may include, but is not limited to, voice data, audio data, and/or streaming video data. Note that each of the real-time devices 14 and 22 may be a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

The wireless non-real-time device 20 and the wireline non-real-time device 12 communicate non-real-time data that, if interrupted, would not generally result in a noticeable adverse affect. For example, non-real-time data may include, but is not limited to, text messages, still video images, graphics, control data, emails, and/or web browsing. Note that each of the non-real-time devices 14 and 22 may be a personal computer, laptop computer, personal digital assistant, a cellular telephone, a cable set-top box, a satellite set-top box, a game console, a global positioning satellite (GPS) receiver, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device.

Depending on the real-time and non-real-time devices coupled to the communication unit 10, the communication unit 10 may participate in cellular voice communications, cellular data communications, video capture, video playback, audio capture, audio playback, image capture, image playback, voice over internet protocol (i.e., voice over IP), sending and/or receiving emails, web browsing, playing video games locally, playing video games via the internet, word processing generation and/or editing, spreadsheet generation and/or editing, database generation and/or editing, one-to-many communications, viewing broadcast television, receiving broadcast radio, cable broadcasts, and/or satellite broadcasts.

Figure 2:
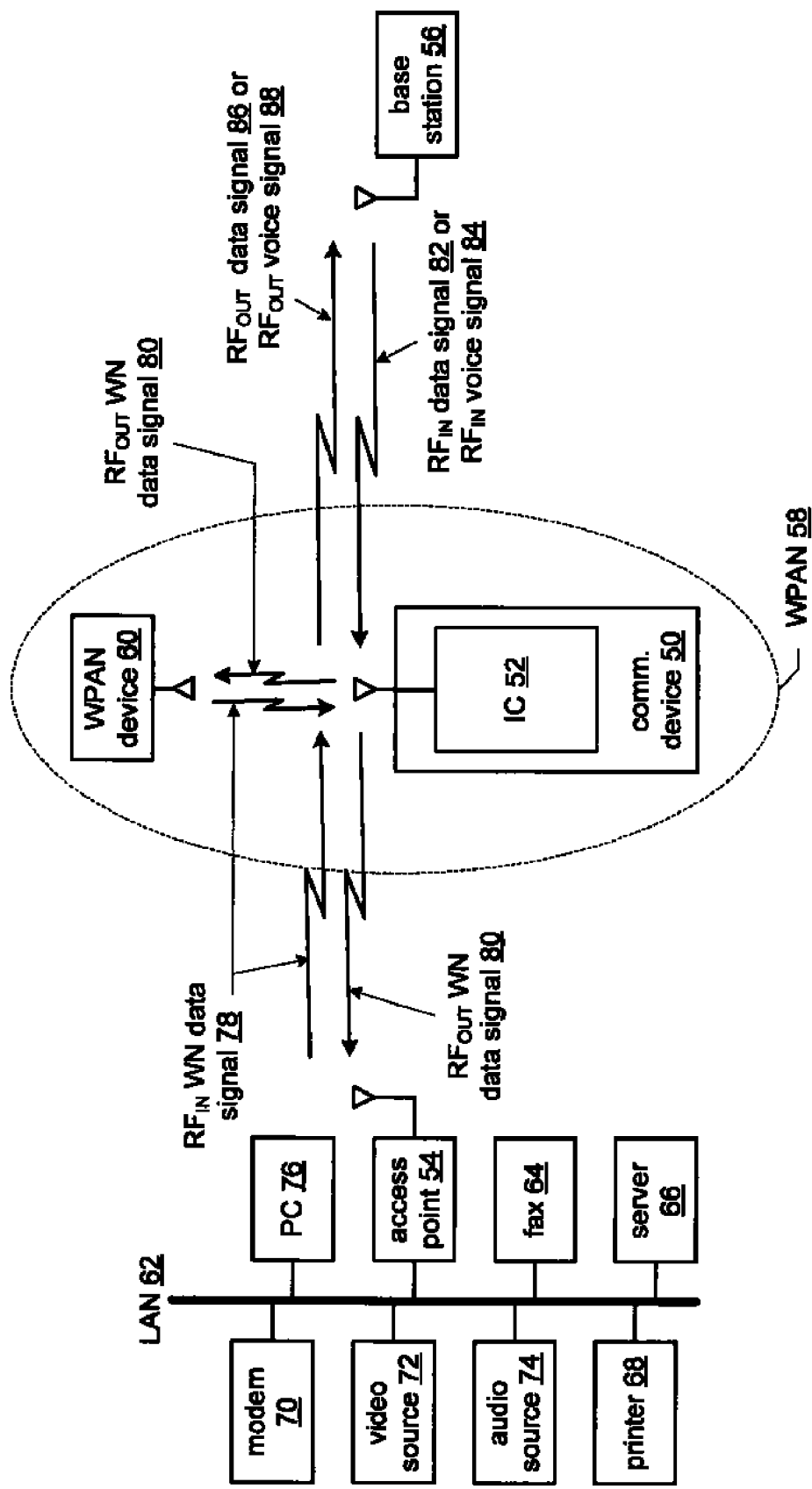
FIG. 2 is a schematic block diagram of another embodiment of a wireless communication system in accordance with the present invention.

FIG. 2 is a schematic block diagram of another embodiment of a wireless communication system that includes a communication device 50 associated with a cellular network, a wireless local area network (WLAN) and/or a wireless personal area network (WPAN) 58. The WLAN network is shown to include an access point 54, a local area network (LAN) bus 62, a modem 70, a video source 72, an audio source 74, a printer 68, a personal computer (PC) 76, a facsimile machine (fax) 64, and a server 66, but may include more or less components than shown. The cellular network is shown to include a base station 56, which may support voice communications and/or data communications. Note that the cellular network may include more components than the base station 56. The WPAN 58 includes at least one WPAN device 60 that is proximal to the communication device 50. Note that the WPAN device 60 may be a Bluetooth headset, a wireless microphone, a wireless speaker, a wireless display, and/or a wireless data entry unit.

In this embodiment, the communication device 50, which may be one of the communication devices 18-32 of FIG. 1 or another type of communication device, includes an integrated circuit (IC) 52 to communication with the cellular network, the WLAN, and/or the WPAN. Such a communication may include voice communications, audio communications, video communications, graphics communications, text communications, and/or data communications (e.g., emails, web browsing, short message services, etc.). For example, the communication device 50 may be receiving an audio file from the audio source 74 (e.g., a computer storing an MP3 file, a radio receiver, a cable set top box, a satellite receiver, a CD player, etc.), the server 66, and/or the PC 76 via the access point 54 as an inbound RF wireless network (WN) data signal 78. The IC 52 processes the inbound RF WN data signal 78 to produce inbound data that may be rendered audible by speaker circuitry of the IC 52 and/or communication device 50. Alternatively and/or in addition to, the IC 52 may convert the inbound data signal from the WLAN to an outbound RF WN data signal 80 that is provided to the WPAN device 60, which may reproduce the inbound data for presentation (e.g., render it audible).

As another example, the communication device 50 may be receiving a video file from the video source 72 (e.g., a computer storing a video file, a cable set top box, a satellite receiver, a DVDD player, etc.), the server 66, and/or the PC 76 via the access point 54 as an inbound RF WN data signal 78. The IC 52 processes the inbound RF WN data signal 78 to produce inbound data that may be presented on a display (e.g., speakers and LCD, DLP, or plasma display panel) of the communication device 50. Alternatively and/or in addition to, the IC 52 may convert the inbound data signal from the WLAN to an outbound RF WN data signal 80 that is provided to the WPAN device 60, which may reproduce the inbound data for presentation (e.g., play the video file).

As yet another example, the communication device 50 may record video, voice, and/or audio to produce a recorded file. In this example, the IC 52 may convert the recorded file into an outbound RF WN data signal 80 that is provided to the WLAN. The access point 54 recovers the recorded file and provides it to one of the other devices (e.g., PC 76, server 66, modem 70) for storage and/or forwarding onto the Internet.

As a further example, the modem 70, the PC 76, the server 66, the fax 64, and/or the printer 68 may provide a file to the access point 54 for communication to the communication device 50. In this instance, the access point 54 converts the file into the inbound WN data signal 78. The IC 52 processes the received the inbound WN data signal 78 to recapture the file, which may be presented on the communication device 50 and/or provided to the WPAN device 60.

As yet a further example, the communication device 50 may have a graphics, text, and/or a data file for communication to a component of the WLAN. In this example, the IC 52 converts the graphics, text, and/or data file into the outbound RF WN data signal 80 that is provided to the access point 54 and/or to the WPAN 60. In one embodiment, the access point 54 recovers the graphics, text, and/or data file and provides it to the PC 76, the modem 70, the fax 64, the printer 68, and/or the server 66. Note that the file may include an address that identifies which component(s) of the WLAN are to receive the file.

More examples include voice and/or data communications between the communication device 50 and the base station 56 in accordance with one or more cellular communication standards, which includes, but is not limited to, past, present, and/or future versions of GSM, CDMA, wideband CDMA (WCDMA), EDGE, GPRS, AMPS, and digital AMPS. For instance, the IC 52 may process outbound voice signals to produce outbound RF voice signals 88 and process inbound RF voice signals 84 to produce inbound voice signals. The IC 52 may facilitate the presentation of the inbound and outbound voice signals on the communication device 50 and/or transceive them with the WPAN device 60 as the inbound and outbound WN data signals 78 and 80. Further the IC 52 may process outbound data signals to produce outbound RF data signals 86 and process inbound RF data signals 82 to produce inbound data signals. The IC 52 may facilitate the presentation of the inbound and outbound data signals on the communication device 50 and/or transceive them with the WPAN device 60 as the inbound and outbound WN data signals 78 and 80.

Figure 3:
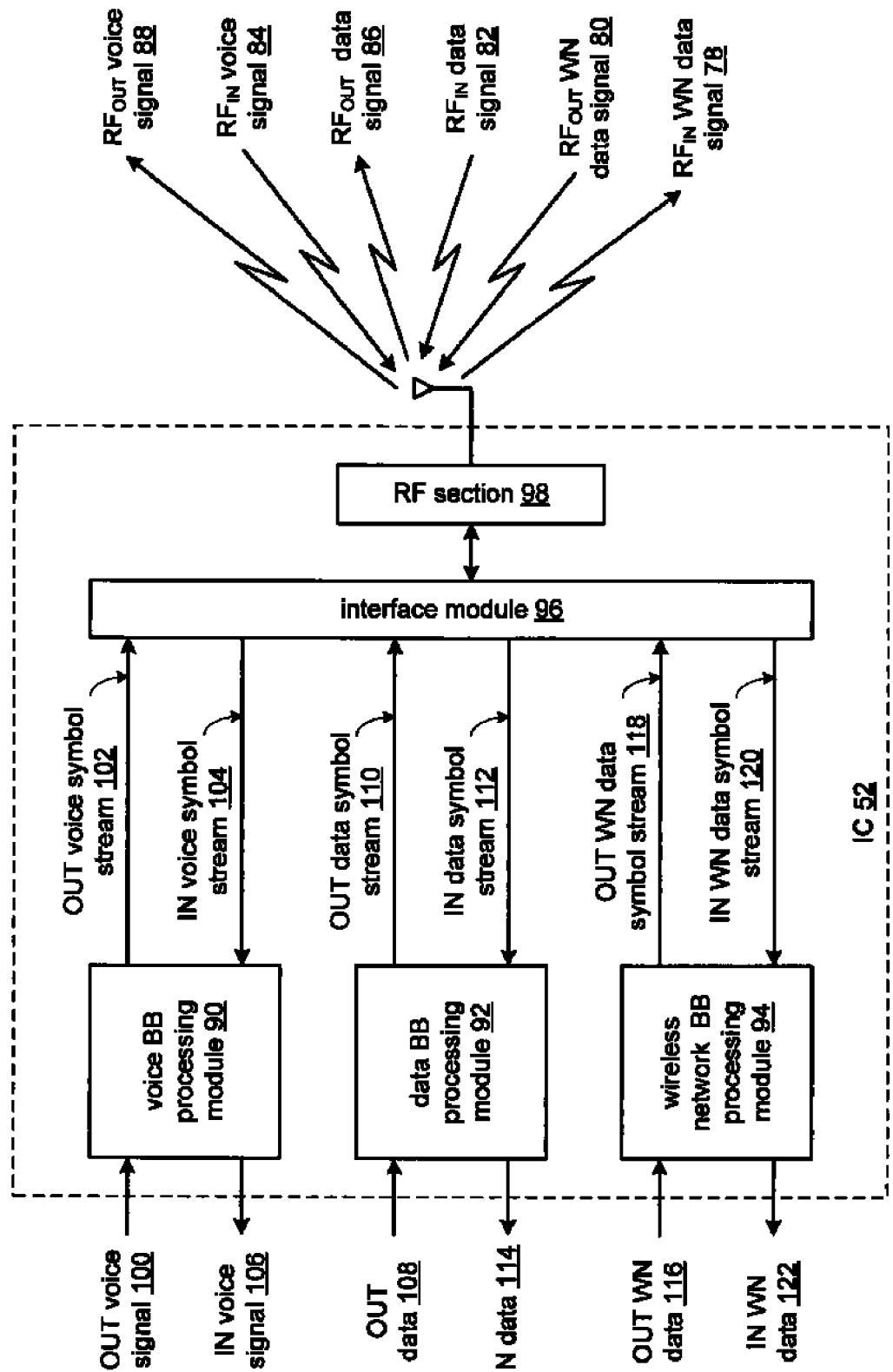
FIG. 3 is a schematic block diagram of an embodiment of an integrated circuit in accordance with the present invention.

FIG. 3 is a schematic block diagram of an embodiment of an integrated circuit (IC) 52 that includes a voice baseband (BB) processing module 90, a data BB processing module 92, a wireless network BB processing module 94, an interface module 96, and a radio frequency (RF) section 98. The BB processing modules 90-94 may be separate processing modules and/or shared processing modules, where a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module(s) may have an associated memory and/or memory element, which may be a single memory device, a plurality of memory devices, and/or embedded circuitry of the processing module(s). Such a memory device may be a read-only memory, random access memory, volatile memory, non-volatile memory, static memory, dynamic memory, flash memory, cache memory, and/or any device that stores digital information. Note that when the processing module(s) implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module(s)

executes, hard coded and/or operational instructions corresponding to at least some of the steps and/or functions illustrated in FIGS. 2-13.

In an embodiment, the voice baseband processing module 90 is coupled to convert an outbound voice signal 100 into an outbound voice symbol stream 102 and to convert an inbound voice symbol stream 104 into an inbound voice signal 106 in accordance with a cellular voice protocol (e.g., past, present, or future versions of GSM, AMPS, CDMA, WCDMA, etc.). The data baseband processing module 92 is coupled to convert outbound data 108 into an outbound data symbol stream 110 and to convert an inbound data symbol stream 112 into inbound data 114 in accordance with a cellular data protocol (e.g., past, present, or future versions of EDGE, GPRS, etc.).

The wireless network baseband processing module 94 is coupled to convert outbound wireless network data 116 into an outbound wireless network data symbol stream 118 and to convert an inbound wireless network data symbol stream 120 into inbound wireless network data 122 in accordance with a wireless network protocol (e.g., past, present, or future versions of Bluetooth, IEEE 802.11, ZIGBEE, RFID, etc.). In one embodiment, the wireless network baseband processing module 94 converts the outbound wireless network data 116 into the outbound wireless network data symbol stream 118 and converts the inbound wireless network data symbol stream 120 into the inbound wireless network data 122 in accordance with a wireless local area network (WLAN) protocol. In another embodiment, the wireless network baseband processing module 94 converts the outbound wireless network data 116 into the outbound wireless network data symbol stream 118 and converts the inbound wireless network data symbol stream 120 into the inbound wireless network data 122 in accordance with a wireless personal area network (WPAN), a near field communication protocol, and/or a far field communication protocol.

The interface module 98, which may be implemented as described in co-pending patent application entitled VOICE/DATA/RF INTEGRATED CIRCUIT, having a filing date of Dec. 19, 2006, and a Ser. No. of 11/641,999, provides coupling between the baseband processing modules 90-94 and the RF section 98. For instance, the interface module 98 conveys the inbound voice symbol stream 104 and the outbound voice symbol stream 102 between the voice baseband processing module 90 and the RF section 98. In addition, the interface module 98 conveys the inbound data symbol stream 112 and the outbound data symbol stream 110 between the data baseband processing module 92 and the RF section 98. Further, the interface module 96 conveys the inbound wireless network data symbol stream 120 and the outbound wireless network data symbol stream 118 between the wireless network baseband processing module 94 and the RF section 98.

The RF section 98 (embodiment of which will be described with reference to FIGS. 4, 6, and 7) is coupled to convert an inbound RF voice signal 84 into the inbound voice symbol stream 104 and to convert the outbound voice symbol stream 102 into an outbound RF voice signal 88 in accordance with the cellular voice protocol. The RF section 98 is also coupled to convert an inbound RF data signal 82 into the inbound data symbol stream 112 and to convert the outbound data symbol stream 110 into an outbound RF data signal 86 in accordance with the cellular data protocol. The RF section 98 is further coupled to convert an inbound RF wireless network data signal 78 into the inbound wireless network data symbol stream 120 and to convert the outbound wireless network data symbol stream 118 into an outbound RF wireless network data signal 80 in accordance with the wireless network protocol.

In various uses of the IC 52, the voice baseband processing module 90, the data baseband processing module 92, the wireless network baseband processing module 94, and the RF section 98 may perform one or more of: converting the inbound RF voice signal 84 into an outbound wireless personal area network (WPAN) RF voice signal 80; converting the inbound RF voice signal 84 into an outbound wireless local area network (WLAN) RF voice signal 80; converting the inbound RF voice signal 84 into an inbound analog voice signal 106; converting the inbound RF data signal 82 into an outbound WPAN RF data signal 80; converting the inbound RF data signal 82 into an outbound WLAN RF data signal 80; converting the inbound RF data signal 82 into an inbound data display signal 114; converting an outbound RF WPAN signal 80 into an outbound RF voice signal 88; and converting an outbound RF WPAN signal 80 into an outbound RF WLAN signal 80.

Figure 4:
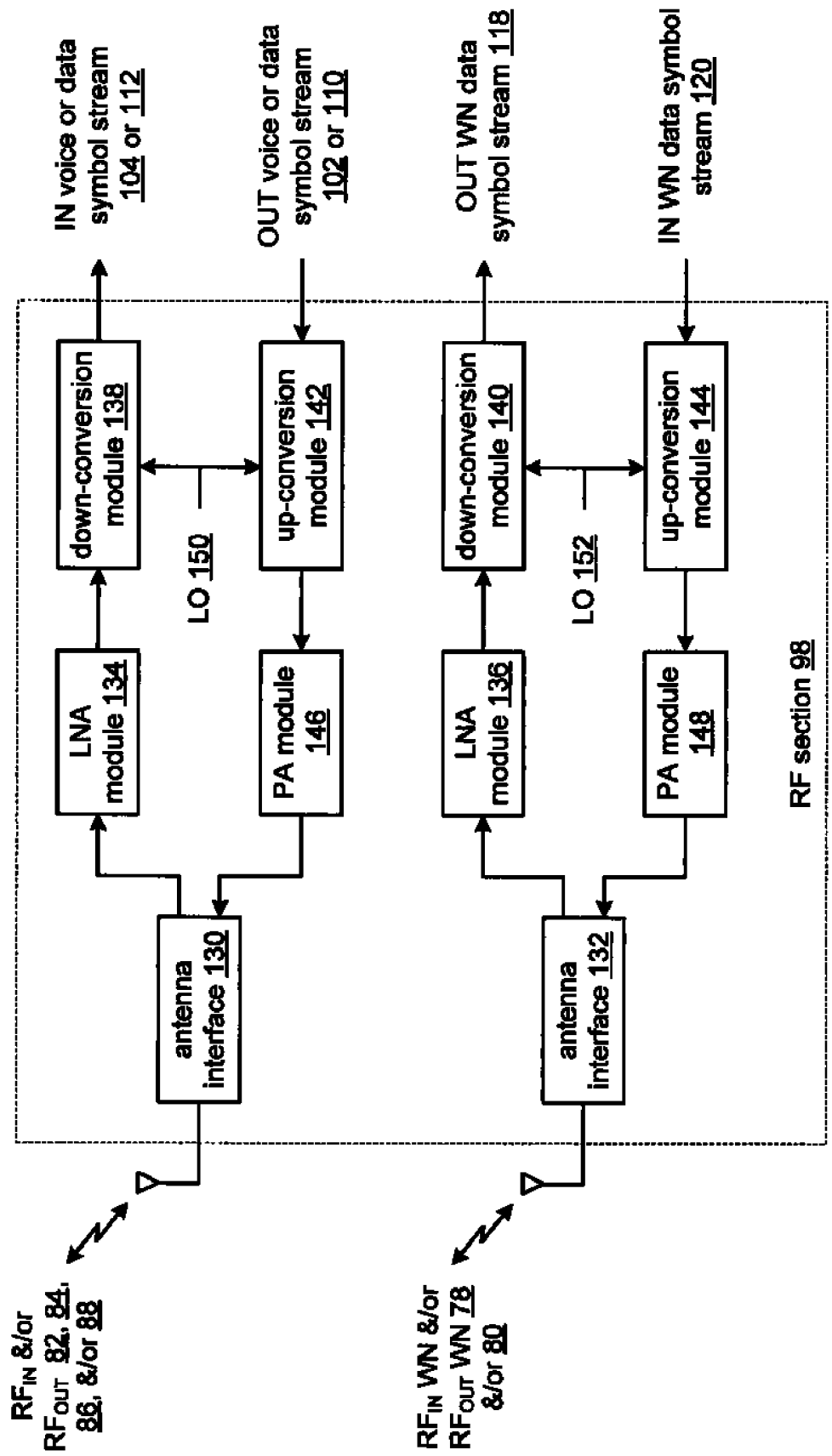
FIG. 4 is a schematic block diagram of an embodiment of an RF section in accordance with the present invention.

FIG. 4 is a schematic block diagram of an embodiment of an RF section 98 that includes first and second antenna interfaces 130 and 132, first and second low noise amplifier (LNA) modules 134 and 136, first and second down-conversion modules 138 and 140, first and second up-conversion modules 142 and 144, and first and second power amplifier (PA) modules 146 and 148.

The first antenna interface 130, which may include a transformer balun, a transmit/receive switch, an impedance matching circuit, and/or a transmission line, is coupled to a first antenna structure that transceives the inbound and outbound RF voice signals 84 and 88 and/or the inbound and outbound RF data signals 82 and 86 in a first frequency band. The first antenna structure includes one or more antennas that are operable in the first frequency band and are arranged in a diversity pattern, in an orthogonal pattern, as an array, in a polarization pattern, and/or in a combination thereof.

The second antenna interface 132, which may include a transformer balun, a transmit/receive switch, an impedance matching circuit, and/or a transmission line, is coupled to a second antenna structure that transceives the inbound and outbound RF wireless network signals 78 and 80 in a second frequency band. The second antenna structure includes one or more antennas that are operable in the first frequency band and are arranged in a diversity pattern, in an orthogonal pattern, as an array, in a polarization pattern, and/or in a combination thereof.

As an example of the first and second frequency bands, assume that the wireless network signals 78 and 80 are generated in accordance with an IEEE802.11 standard such that the second frequency band corresponds to the 2.4 GHz frequency band (e.g., 2.412-2.483 GHz) and/or the 5 GHz frequency band (e.g., 5.15-5.35 GHz and 5.725-5.825 GHz). Further assume that the voice signals 84 and 88 are generated in accordance with frequency division duplex (FDD) WCDMA such that the first frequency band corresponds to a 1900 MHz and 2100 MHz frequency bands (e.g., 1920-1980 MHz for uplink communications and 2110-2170 MHz for downlink communications). As another example, assume that the voice signals 84 and 88 are generated in accordance with time division duplex (TDD) WCDMA such that the first frequency band corresponds to the 1900 and 2100 MHz frequency bands (e.g., 1900-1920 MHz and 2010-2025 MHz, which are shared by the uplink and downlink communications). As yet another example, assume that the wireless network signals 78 and 80 are generated in accordance with a Bluetooth standard such that the second frequency band corresponds to a 2.4 GHz frequency band (e.g., 2400 MHz to 2483.5 MHz). As a further example, assume that the voice signals 84 and 88 are generated in accordance with a GSM standard such that the second frequency band corresponds to a 900 MHz frequency band (e.g., 880-915 MHz and 925-960 MHz), an 1800 Hz frequency band (e.g., 1710-1785 MHz and 1805-1880 MHz), and/or a 1900 MHz frequency band (e.g., 1850-1910 MHz and 1930-1990 MHz). As yet a further example, assume that the data signals 82 and 86 are generated in accordance with an EDGE standard such that the second frequency band corresponds to the 900 MHz, 1800 Hz, and/or 1900 MHz frequency bands. As still another example, assume that the data signals 82 and 86 are generated in accordance with a GPRS standard such that the second frequency band corresponds to the 900 MHz, 1800 Hz, and/or 1900 MHz frequency bands.

The first low noise amplifier module 134, which includes one ore more low noise amplifiers coupled in series, in parallel, or a combination thereof, is coupled to amplify the inbound RF voice signal 84 or the inbound RF data signal 82 to produce an amplified inbound RF voice or data signal. The first down conversion module 138, which may include one or more mixers, a bandpass filter or a low pass filter, is coupled to convert the amplified inbound RF voice or data signal into the inbound voice or data symbol stream 104 or 112 in accordance with a first local oscillation 150. For example, for a direct conversion down converter, the first local oscillation 150 corresponds to the carrier frequency of the inbound RF voice or data signal 84 or 82, which is mixed with the amplified inbound RF voice or data signal to produce a mixed signal (two mixed signals if the amplified inbound RF voice or data signal includes in-phase and quadrature components) that is filtered by the bandpass or low pass filter to produce the inbound voice or data symbol stream 104 or 112.

The first up conversion module 142, which includes one or more mixers and a bandpass filter, is coupled to convert the outbound voice symbol stream 102 or the outbound data symbol stream 110 into an up-converted voice or data signal in accordance with the first local oscillation 150. In an embodiment, the first local oscillation 150 is generated by a phase locked loop that is modulated in accordance with the outbound voice or data symbol stream 102 or 110 and filtered to produce the up-converted voice or data signal. In another embodiment, an in-phase component of the first local oscillation 150 is mixed with an in-phase component of the outbound voice or data symbol stream 102 or 110 to produce a first mixed signal and a quadrature component of the first local oscillation 150 is mixed with a quadrature component of the outbound voice or data symbol stream 102 or 110 to produce a second mixed signal, where the first and second mixed signals are combined and filtered to produce the up-converted voice or data signal.

The first power amplifier module 146, which includes one or more power amplifiers and/or one or more power amplifier drivers coupled in series and/or in parallel, is coupled to amplify the up-converted voice or data signal to produce the outbound RF voice signal 88 or the outbound RF data signal 86. The first PA module 146 provides the outbound RF voice or data signal 88 or 86 to the first antenna interface 130 for transmission via the first antenna structure. Note that the first PA module 146 may amplify the up-converted data signal in accordance with amplitude modulation information when the outbound data symbol stream 110 includes the amplitude modulation information.

The second low noise amplifier module 132, which includes one ore more low noise amplifiers coupled in series, in parallel, or a combination thereof, is coupled to amplify the inbound RF wireless network signal 78 to produce an amplified inbound RF wireless network signal. The second down conversion module 140, which may include one or more mixers, a bandpass filter or a low pass filter, is coupled to convert the amplified inbound RF wireless network signal into the inbound wireless network data symbol stream 120 in accordance with a second local oscillation 152. For example, for a direct conversion down converter, the second local oscillation 152 corresponds to the carrier frequency of the inbound RF wireless network signal 78, which is mixed with the amplified inbound RF wireless network data signal to produce a mixed signal (two mixed signals if the amplified inbound RF wireless network data signal includes in-phase and quadrature components) that is filtered by the bandpass or low pass filter to produce the inbound wireless network data symbol stream 120.

The second up conversion module 144, which includes one or more mixers and a bandpass filter, is coupled to convert the outbound wireless network data symbol stream 118 into an up-converted wireless network data signal in accordance with the second local oscillation 152. In an embodiment, the second local oscillation 152 is generated by a phase locked loop that is modulated in accordance with the outbound wireless network data symbol stream 118 and filtered to produce the up-converted wireless network data signal. In another embodiment, an in-phase component of the second local oscillation 152 is mixed with an in-phase component of the outbound wireless network data symbol stream 118 to produce a first mixed signal and a quadrature component of the second local oscillation 152 is mixed with a quadrature component of the outbound wireless network data symbol stream 118 to produce a second mixed signal, where the first and second mixed signals are combined and filtered to produce the up-converted wireless network data signal.

The second power amplifier module 148, which includes one or more power amplifiers and/or one or more power amplifier drivers coupled in series and/or in parallel, is coupled to amplify the up-converted wireless network data signal to produce the outbound RF wireless network signal 80. The second PA module 148 provides the outbound RF wireless network signal 80 to the second antenna interface 132 for transmission via the second antenna structure. Note that the second PA module 148 may amplify the up-converted wireless network data signal in accordance with amplitude modulation information when the outbound WN data symbol stream 118 includes the amplitude modulation information.

Figure 5:
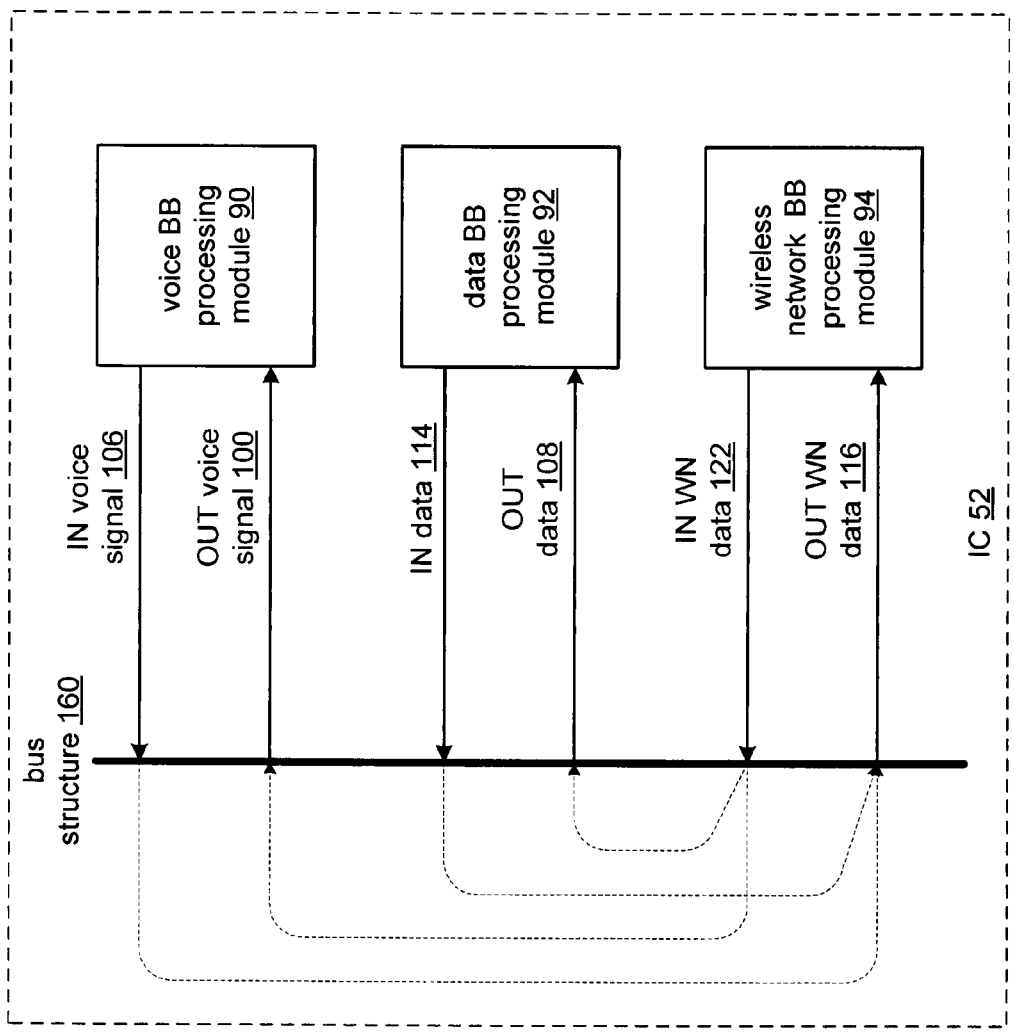
FIG. 5 is a schematic block diagram of another embodiment of an integrated circuit in accordance with the present invention.

FIG. 5 is a schematic block diagram of another embodiment of the integrated circuit 52 that includes the baseband processing modules 90-94 coupled to a bus structure 160, which may include one or more multiple bit bus lines. In one embodiment, the voice baseband processing module 90 provides, via the bus structure 160, the inbound voice signal 106 as the outbound wireless network data 116 to the wireless network baseband processing module 94 and the wireless network baseband processing module 94 provides, via the bus structure 160, the inbound wireless network data 116 as the outbound voice signal 100 to the voice baseband processing module 90. As an example, assume that the communication device includes a wireless headset such that the wireless headset provides the user interface for a voice cellular communication. As another example, assume that the wireless network is a WLAN such that the voice communication is routed to a WLAN device for storage. As yet another example, the voice communication may be simultaneously or sequentially provided to a WPAN device for presentation to a user and to a WLAN device for storage.

In another embodiment, the data baseband processing module 92 converts the inbound data signal 114 into an inbound converted voice signal and provides, via the bus structure 160, the inbound converted voice signal as the outbound wireless network data 116 to the wireless network baseband processing module 94. For example, a text message, a file transfer, an email message, a web browsing operation, etc., may be received via the cellular data portion of the communication device that is converted into a voice message by the data BB processing module 92 and provided to the WN BB processing module 94. The WN BB process module 94 converts the voice message into a WN data symbol that is subsequently provided to a wireless headset via the RF section.

In another embodiment, the wireless network baseband processing module 94 provides, via the bus structure 160, the inbound wireless network data 122 as the outbound data signal 108 to the data baseband processing module 92. For example, a user may respond to a received data communication or initiate a new data communication via a wireless headset. In this example, the WN BB processing module produces the inbound WN data 122 based on the response or new data communication. The WN data 122 may be converted to a text message that is provided to the data BB processing module 92 for processing and subsequent transmission as an outbound RF data signal by the RF section.

Figure 6:
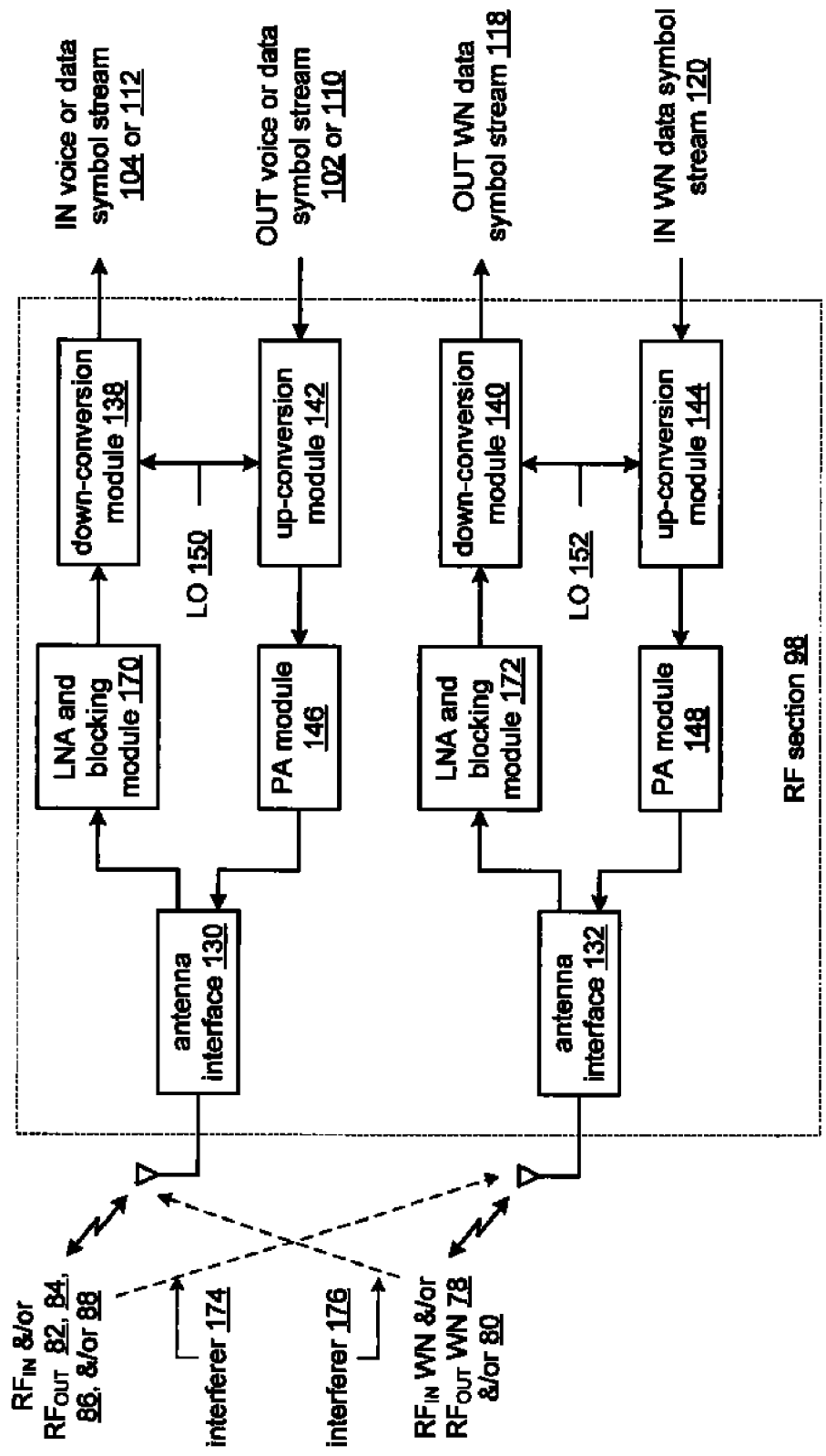
FIG. 6 is a schematic block diagram of another embodiment of an RF section in accordance with the present invention.

FIG. 6 is a schematic block diagram of another embodiment of an RF section 98 that includes the first and second antenna interfaces 130 and 132 coupled to the first and second antenna structures, first and second low noise amplifier (LNA) and blocking modules 170 and 172, the first and second down-conversion modules 138 and 140, the first and second up-conversion modules 142 and 144, and the first and second power amplifier (PA) modules 146 and 148.

In this embodiment, the first antenna structure transceives the inbound and outbound RF voice signals 84 and 88 or the inbound and outbound RF data signals 82 and 86 in a first frequency band (e.g., the 1800 Hz, 1900 MHz, and/or 2100 MHz frequency bands) and the second antenna structure transceives the inbound and outbound RF wireless network signals 78 and 80 in a second frequency band (e.g., the 2.4 GHz frequency band). In addition, the first antenna structure receives the inbound RF wireless network signal 78 and/or the outbound RF wireless network signal 80 as a first interferer 176 and the second antenna structure receives the outbound RF voice or data signal 86 or 88 and/or the inbound RF voice or data signal 84 or 82 as a second interferer 174.

The first low noise amplifier and blocking module 170 (an embodiment of which will be described in greater detail with reference to FIG. 7) is coupled to amplify the inbound RF voice signal or the inbound RF data signal 84 or 82 and block the first interferer 176 to produce an amplified inbound RF voice or data signal. The first down conversion module 130 is coupled to convert the amplified inbound RF voice or data signal into the inbound voice or data symbol stream 104 or 106 in accordance with the first local oscillation 150.

The second low noise amplifier and blocking module 172 (an embodiment of which will be described in greater detail with reference to FIG. 7) is coupled to amplify the inbound RF wireless network signal 78 and block the second interferer 174 to produce an amplified inbound RF wireless network signal. The second down conversion module 140 is coupled to convert the amplified inbound RF wireless network signal into the inbound wireless network symbol stream 120 in accordance with the second local oscillation 152.

Figure 7:
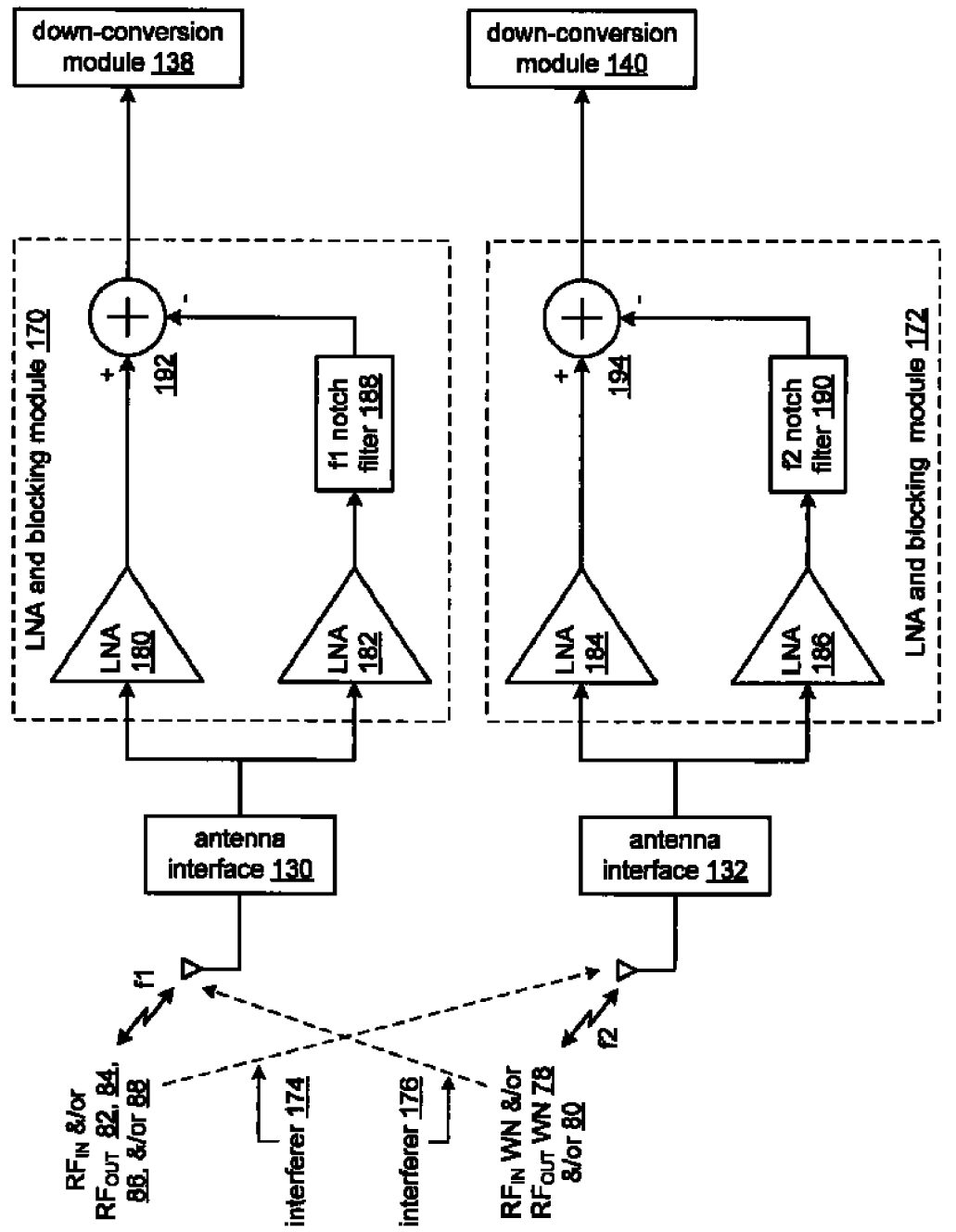
FIG. 7 is a schematic block diagram of another embodiment of an RF section in accordance with the present invention.

FIG. 7 is a schematic block diagram of another embodiment of an RF section 98 that includes the first and second antenna interfaces 130 and 132 coupled to the first and second antenna structures, first and second low noise amplifier (LNA) and blocking modules 170 and 172, and the first and second down-conversion modules 138 and 140. In this embodiment, the LNA and blocking modules 170 and 172 each includes a pair of LNAs 180, 182 and 184, 186, a notch filter 188 and 190, and a subtraction module 192 and 194.

The first LNA and blocking module 170 receives the inbound RF voice or data signal 84 or 82 and the first interferer 176 via the first antenna interface 130. The first and second LNAs 180 and 182 amplify the received inbound RF voice or data signal 84 or 82 and the first interferer 176. The output of the second LNA 182 is filtered by a first frequency band (f1) notch filter 188 such that the interferer 176 is passed substantially unattenuated and the inbound RF voice or data signal 84 is substantially attenuated (e.g., by at least 20 dB). The subtraction module 192 subtracts the passed interferer from the output of the first LNA 180 to produce the amplified inbound RF voice or data signal.

The second LNA and blocking module 172 receives the inbound RF wireless network data signal 78 and the second interferer 174 via the second antenna interface 132. The first and second LNAs 184 and 186 amplify the received inbound RF wireless network data signal 78 and the second interferer 174. The output of the second LNA 186 is filtered by a second frequency band (f2) notch filter 190 such that the interferer 174 is passed substantially unattenuated and the inbound RF wireless network data signal 78 is substantially attenuated (e.g., by at least 20 dB). The subtraction module 194 subtracts the passed interferer from the output of the first LNA 184 to produce the amplified inbound RF wireless network signal.

Figure 8:
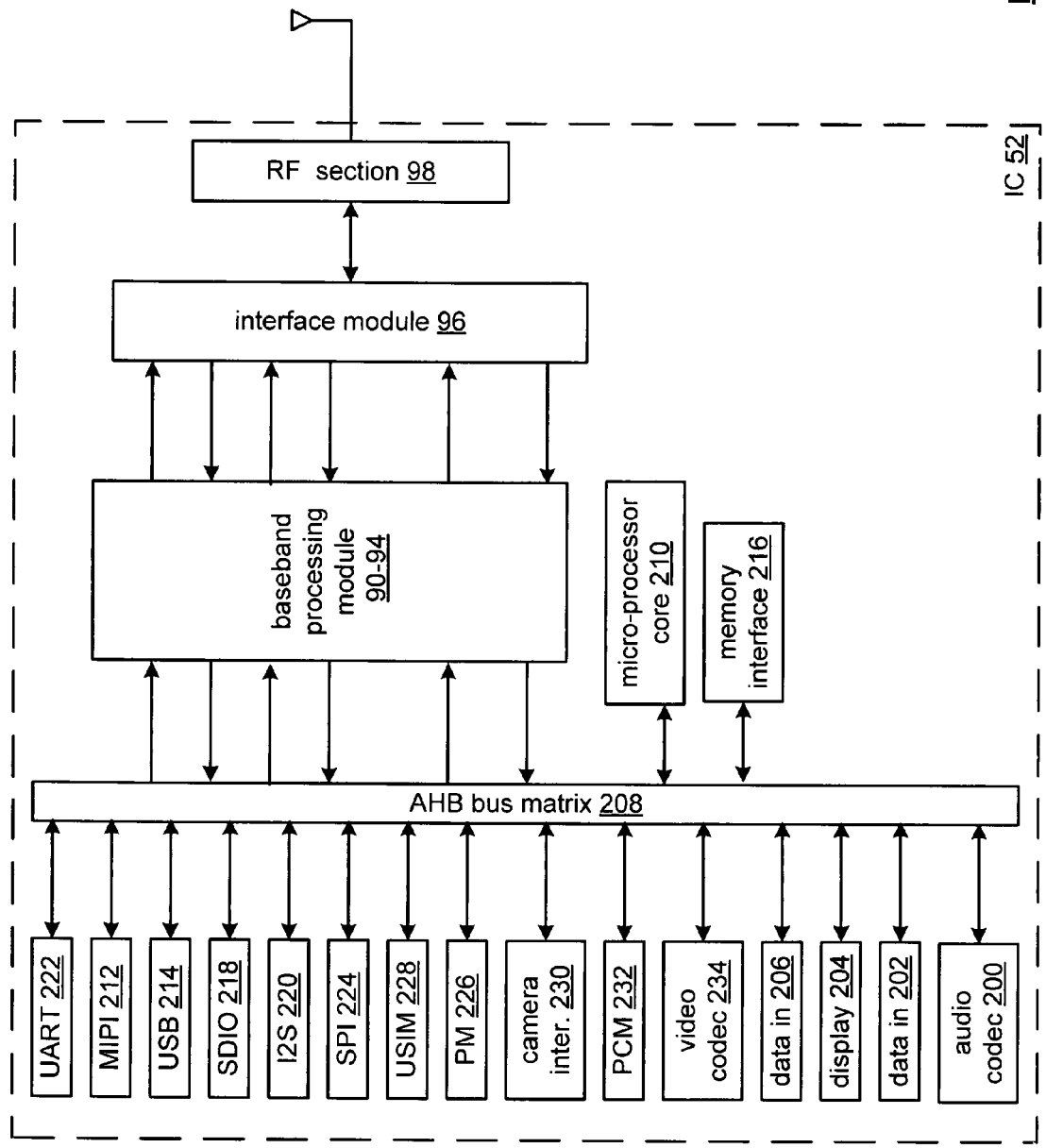
FIG. 8 is a schematic block diagram of another embodiment of an integrated circuit in accordance with the present invention.

FIG. 8 is a schematic block diagram of another embodiment of the integrated circuit 52 that includes the baseband processing modules 90-94, the interface module 96, the RF section 98, and at least one of: an audio codec 200 coupled to convert an outbound analog voice signal into the outbound voice signal and to convert the inbound voice signal into an inbound analog voice signal; a data input interface 202 coupled to provide the outbound data to the data baseband processing module 92; a display interface 204 coupled to provide the inbound data to an off-IC display device; a second data input interface 206 providing the outbound data to the display interface; an advanced high-performance (AHB) bus matrix 208 coupled to the voice, data, and wireless network baseband processing modules 90-94; a microprocessor core 210 coupled to the AHB bus matrix 208; a mobile industry processor interface (MIPI) 212 coupled to the AHB bus matrix 208; a universal serial bus (USB) interface 214 coupled to the AHB bus matrix 208; an external memory interface 216 coupled to the AHB bus matrix 208; a secure digital input/output (SDIO) interface 218 coupled to the AHB bus matrix 208; an 12S interface 220 coupled to the AHB bus matrix 208; a Universal Asynchronous Receiver-Transmitter (UART) interface 222 coupled to the AHB bus matrix 208; a Serial Peripheral Interface (SPI) interface 224 coupled to the AHB bus matrix 208; a power management (PM) interface 226; a universal subscriber identity module (USIM) interface 228 coupled to the AHB bus matrix 208; a camera interface 230 coupled to the AHB bus matrix 208; a pulse code modulation (PCM) interface 232 coupled to the AHB bus matrix 208; and a video codec 234 coupled to the AHB bus matrix 208.

Figure 9:
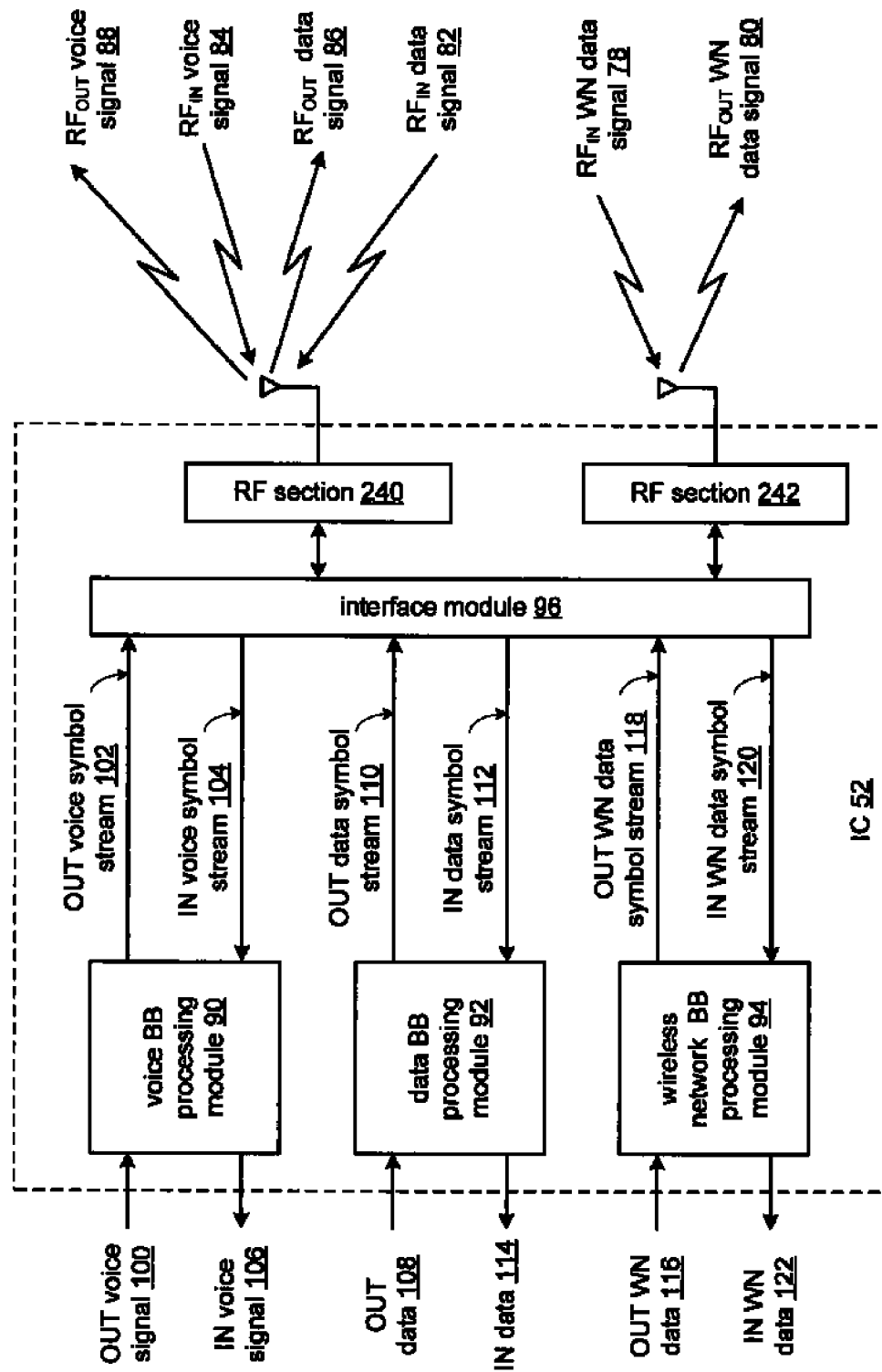
FIG. 9 is a schematic block diagram of another embodiment of an integrated circuit in accordance with the present invention.

FIG. 9 is a schematic block diagram of another embodiment of the integrated circuit 52 that includes the baseband processing modules 90-94, the interface module 96, a first RF section 240, and a second RF section 242. In this embodiment, the voice baseband processing module 90 is coupled to convert an outbound voice signal 100 into an outbound voice symbol stream 102 and to convert an inbound voice symbol stream 104 into an inbound voice signal 106. The data baseband processing module 92 is coupled to convert outbound data 108 into an outbound data symbol stream 110 and to convert an inbound data symbol stream 112 into inbound data 114. The wireless network baseband processing module 94 is coupled to convert outbound wireless network data 116 into an outbound wireless network data symbol stream 118 and to convert an inbound wireless network data symbol stream 120 into inbound wireless network data 122.

The interface module 96 may include two interface modules, wherein the first interface module conveys the inbound voice symbol stream 104 and the outbound voice symbol stream 102 between the voice baseband processing module 90 and the first RF section 240 and conveys the inbound data symbol stream 112 and the outbound data symbol stream 110 between the data baseband processing module 92 and the first RF section 240. The second interface module conveys the inbound wireless network data symbol stream 120 and the outbound wireless network data symbol stream 118 between the wireless network baseband processing module 94 and the second RF section 242.

The first RF section 240 is coupled to convert the inbound RF voice signal 84 into the inbound voice symbol stream 104, convert the outbound voice symbol stream 102 into the outbound RF voice signal 88, convert the inbound RF data signal 82 into the inbound data symbol stream 112, and convert the outbound data symbol stream 110 into the outbound RF data signal 86.

The second RF section 242 is coupled to convert the inbound RF wireless network data signal 78 into the inbound wireless network data symbol stream 120 and convert the outbound wireless network data symbol stream 118 into an outbound RF wireless network data signal 80.

The IC 52 may further include one or more of: an audio codec coupled to convert an outbound analog voice signal into the outbound voice signal and to convert the inbound voice signal into an inbound analog voice signal; a data input interface coupled to provide the outbound data to the data baseband processing module; a display interface coupled to provide the inbound data to an off-IC display device; a second data input interface providing the outbound data to the display interface; an advanced high-performance (AHB) bus matrix coupled to the voice, data, and wireless network baseband processing modules; a microprocessor core coupled to the AHB bus matrix; a mobile industry processor interface (MIPI) coupled to the AHB bus matrix; a universal serial bus (USB) interface coupled to the AHB bus matrix; an external memory interface coupled to the AHB bus matrix; a secure digital input/output (SDIO) interface coupled to the AHB bus matrix; an I2S interface coupled to the AHB bus matrix; a Universal Asynchronous Receiver-Transmitter (UART) interface coupled to the AHB bus matrix; a Serial Peripheral Interface (SPI) interface coupled to the AHB bus matrix; a power management interface; a universal subscriber identity module (USIM) interface coupled to the AHB bus matrix; a camera interface coupled to the AHB bus matrix; a pulse code modulation (PCM) interface coupled to the AHB bus matrix; and a video codec coupled to the AHB bus matrix.

In this embodiment of the IC 52, the voice baseband processing module 90, the data baseband processing module 92, the wireless network baseband processing module 94, the first RF section 240, and the second RF section 242 may further function to perform at least one of: converting the inbound RF voice signal into an outbound wireless personal area network (WPAN) RF voice signal; converting the inbound RF voice signal into an outbound wireless local area network (WLAN) RF voice signal; converting the inbound RF voice signal into an inbound analog voice signal; converting the inbound RF data signal into an outbound WPAN RF data signal; converting the inbound RF data signal into an outbound WLAN RF data signal; converting the inbound RF data signal into an inbound data display signal; converting an outbound RF WPAN signal into an outbound RF voice signal; and converting an outbound RF WPAN signal into an outbound RF WLAN signal.

Figure 10:
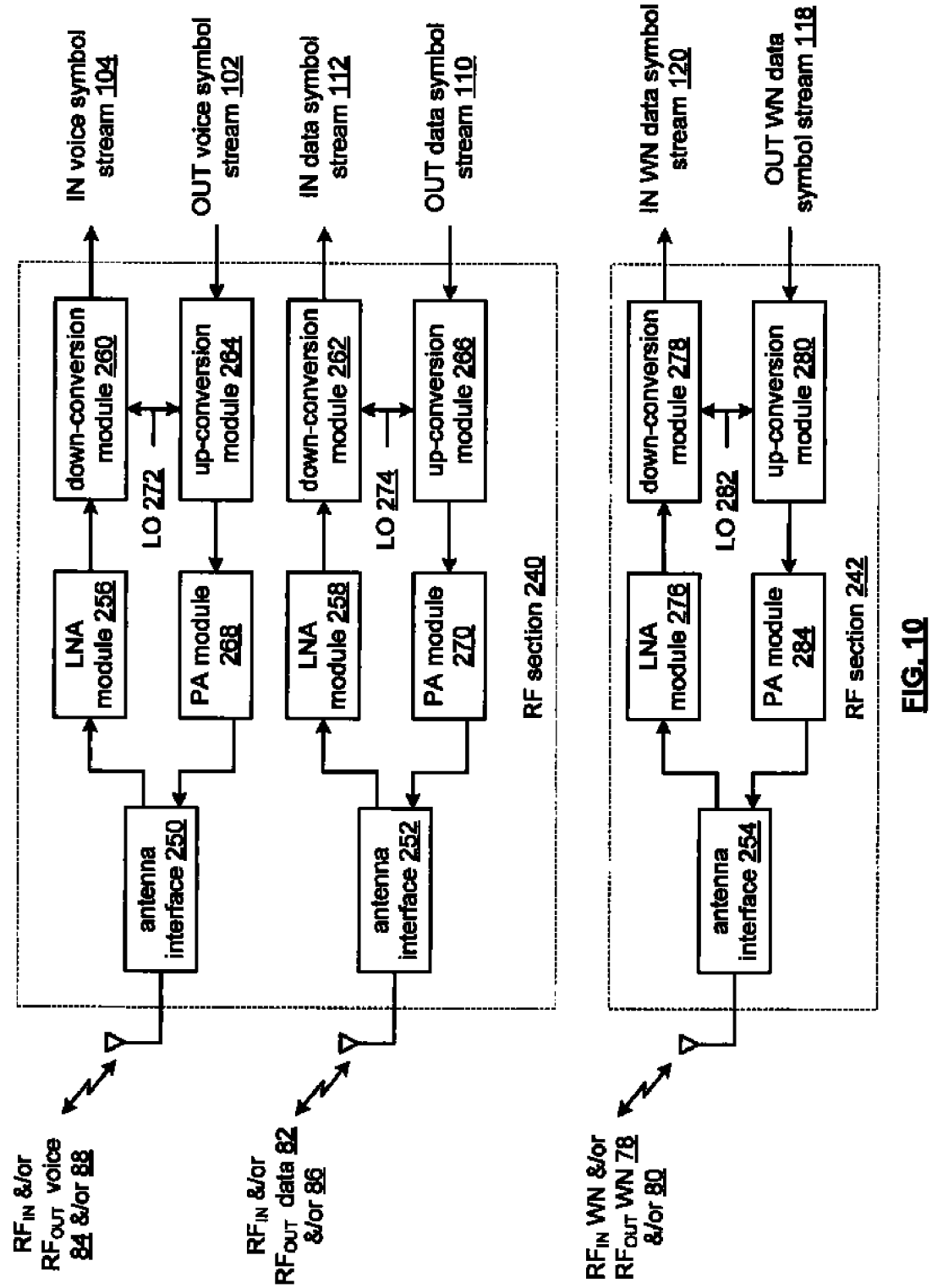
FIG. 10 is a schematic block diagram of embodiments of RF sections in accordance with the present invention.

FIG. 10 is a schematic block diagram of embodiments of RF sections 240 and 242. The first RF section 240 includes first and second antenna interfaces 250 and 252, first and second LNA modules 256 and 258, first and second down conversion modules 260 and 262, first and second up-conversion modules 264 and 266, and first and second power amplifier modules 268 and 270. The second RF section 242 includes an antenna interface 254, an LNA module 276, a down conversion module 278, an up-conversion module 280, and a PA module 284.

Within the first RF section 240, the first antenna interface 250 is coupled to a first antenna structure that transceives the inbound and outbound RF voice signals 84 and 88 in a first frequency band (e.g., 900 MHz, 1800 Hz, 1900 MHz, and/or 2100 MHz). The second antenna interface 152 is coupled to a second antenna structure that transceives the inbound and outbound RF data signals 82 and 86 in a second frequency band (e.g., 900 MHz, 1800 Hz, 1900 MHz, and/or 2100 MHz). The first low noise amplifier module 256 is coupled to amplify the inbound RF voice signal 84 to produce an amplified inbound RF voice signal. The first down conversion module 260 is coupled to convert the amplified inbound RF voice signal into the inbound voice symbol stream 104 in accordance with a first local oscillation 272.

The first up conversion module 264 is coupled to convert the outbound voice symbol stream 102 into an up-converted voice signal in accordance with the first local oscillation 272. The first power amplifier module 284 is coupled to amplify the up-converted voice signal to produce the outbound RF voice signal 88.

The second low noise amplifier module 258 is coupled to amplify the inbound RF data signal 82 to produce an amplified inbound RF data signal. The second down conversion module 262 is coupled to convert the amplified inbound RF data signal into the inbound data symbol stream 112 in accordance with a second local oscillation 274. The second up conversion module 266 is coupled to convert the outbound data symbol stream 110 into an up-converted data signal in accordance with the second local oscillation 274. The second power amplifier module 270 is coupled to amplify the up-converted data signal to produce the outbound RF data signal 86.

Within the second RF section 242, the low noise amplifier module 2276 is coupled to amplify the inbound RF WN data signal 78 to produce an amplified inbound RF WN data signal. The down conversion module 2278 is coupled to convert the amplified inbound RF WN data signal into the inbound WN data symbol stream 120 in accordance with a third local oscillation 282. The up conversion module 280 is coupled to convert the outbound WN data symbol stream 118 into an up-converted WN data signal in accordance with the third local oscillation 282. The power amplifier module 284 is coupled to amplify the up-converted WN data signal to produce the outbound RF WN data signal 80. Note that the antenna interfaces modules 250-254, the LNA modules 256, 258, 276, the down-conversion modules 260, 262, 278, the up-conversion modules 264, 266, 280, and the PA modules 268, 270, 284 may be implemented as previously discussed with reference to FIG. 4.

In an alternative embodiment of the first RF section 240, the first and second LNA modules 256 and 258 may be replaced with LNA and blocking modules as previously described with reference to FIGS. 6 and 7. In this embodiment, the first and second frequency bands may be close in frequency such that one frequency band acts as an interferer to the other frequency band.

Figure 11:
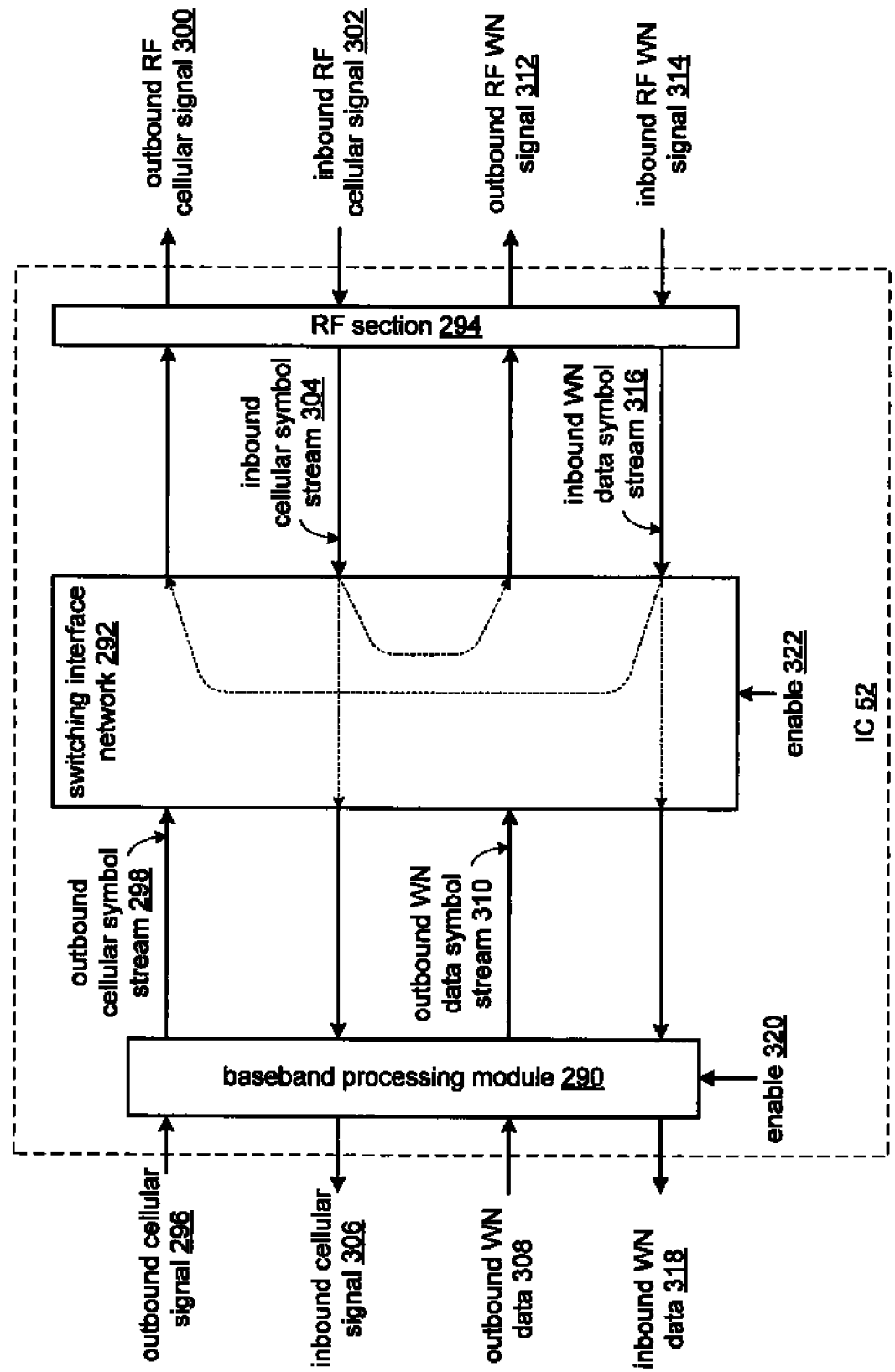
FIG. 11 is a schematic block diagram of another embodiment of an integrated circuit in accordance with the present invention.

FIG. 11 is a schematic block diagram of another embodiment of the integrated circuit 52 that includes a baseband processing module 290, a switching interface network 292, and an RF section 294. The baseband processing module 290 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 290 may have an associated memory and/or memory element, which may be a single memory device, a plurality of memory devices, and/or embedded circuitry of the processing module 290. Such a memory device may be a read-only memory, random access memory, volatile memory, non-volatile memory, static memory, dynamic memory, flash memory, cache memory, and/or any device that stores digital information. Note that when the processing module 290 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module 290 executes, hard coded and/or operational instructions corresponding to at least some of the steps and/or functions illustrated in FIGS. 11-13.

The baseband processing module 290 is selectively enabled 320 to perform one or more of: a conversion of an outbound cellular signal 296 into an outbound cellular symbol stream 298; a conversion of an inbound cellular symbol stream 304 into an inbound cellular signal 306; a conversion of outbound wireless network data 308 into an outbound wireless network data symbol stream 310; and a conversion of an inbound wireless network data symbol stream 316 into inbound wireless network data 318. Note that the wireless network data may include WLAN data and/or WPAN data and that the cellular signals may include cellular voice signals (e.g., GSM, CDMA, WCDMA, AMPS, etc.) and/or cellular data signals (e.g., EDGE, GPRS, etc.). Further note that such conversion may be performed as previously discussed.

The RF section 294, which may include corresponding components as RF section 98, is coupled to convert an inbound RF cellular signal 302 into the inbound cellular symbol stream 304; convert the outbound cellular symbol stream 298 into an outbound RF cellular signal 300; convert an inbound RF wireless network data signal 314 into the inbound wireless network data symbol stream 316; and convert the outbound wireless network data symbol stream 310 into an outbound RF wireless network data signal 312.

The switching interface network 292, which may include a plurality of multiplexers, demultiplexers, switches, transistors, etc., is selectively enabled 322 to perform one or more of: coupling the inbound cellular symbol stream 304 to the baseband processing module 290; coupling the inbound cellular symbol stream 304 to the RF section 294 as the outbound wireless network data symbol stream 310; coupling the inbound wireless network data symbol stream 316 to the baseband processing module 290; and coupling the inbound wireless network data symbol stream 316 to the RF section 294 as the outbound cellular symbol stream 298.

As an example, assume that the IC 52 supports cellular voice communications and WPAN communications with a wireless headset, wherein both the cellular voice communications and WPAN communications use the same data modulation scheme (e.g., QPSK, FSK, GMSK, etc.). In this example, since the data modulation schemes are the same, the inbound symbols 304 and 316 can be routed to the RF section 294 as the other's outbound symbol (e.g., the inbound cellular as the outbound WPAN and the inbound WPAN as the outbound cellular). This avoids have to decode the symbol and re-encode it using the same encode and decode processing.

Figure 12:
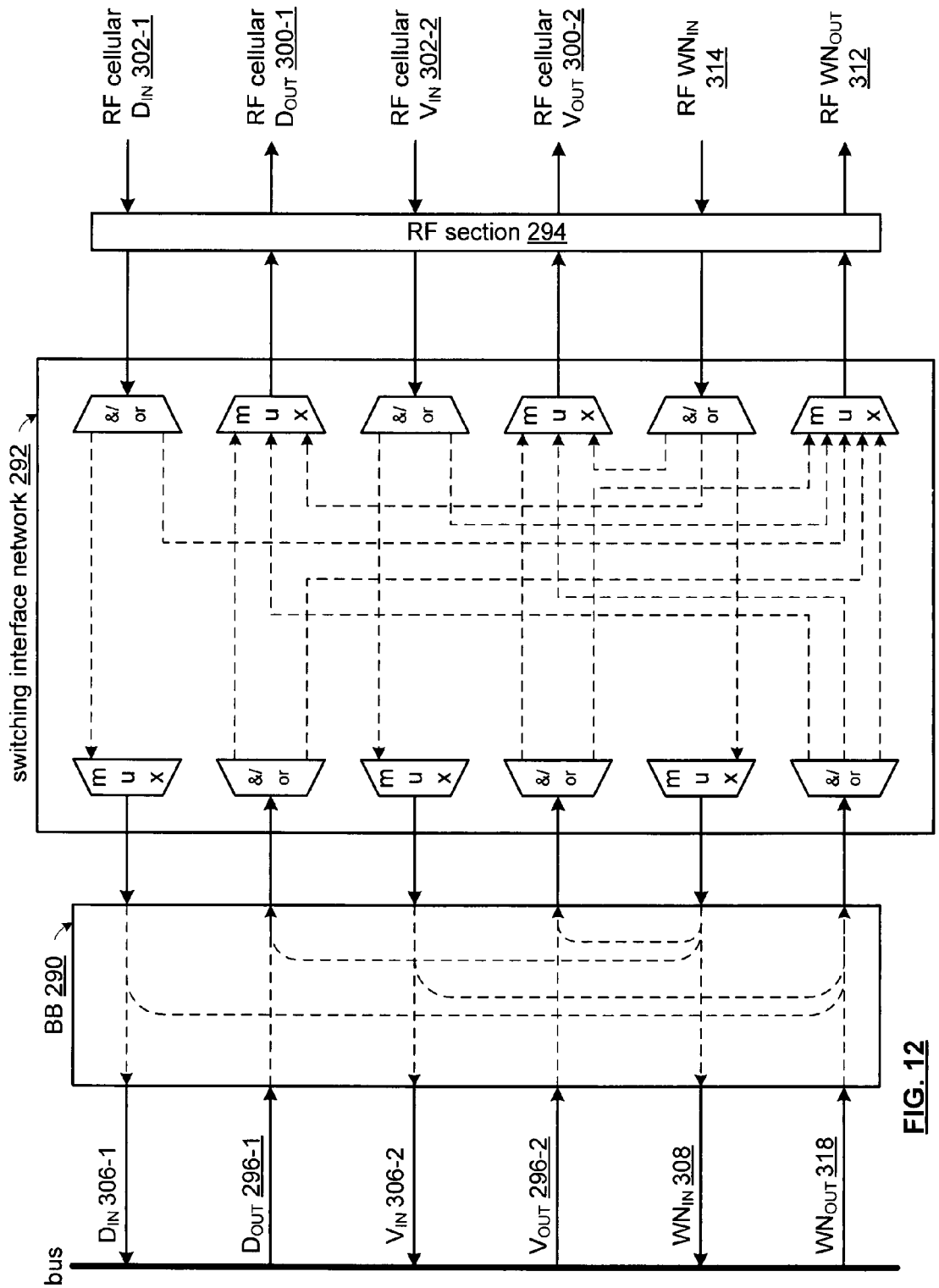
FIG. 12 is a schematic block diagram of another embodiment of an integrated circuit in accordance with the present invention.

FIG. 12 is a schematic block diagram of another embodiment of the integrated circuit 52 that includes the baseband processing module 290, the switching network 292, the RF section 294, and a bus. In this embodiment, depending on the baseband data modulation and demodulation schemes of the cellular voice communications, cellular data communications, and/or wireless network communications, the switching interface network 292, which includes a plurality of multiplexers (MUX) and AND/OR demultiplexers (&/or), may route the inbound or outbound symbols. from one type of communication (e.g., cellular voice, cellular data, and/or wireless network) to another's outbound or inbound symbols directly, which was discussed with reference to FIG. 11.

In addition, the switching interface network 292 may provide an outbound symbol to multiple inputs of the RF section 294. For example, an outbound cellular data symbol stream as produced by the baseband processing module 290 from outbound data ($D_{OUT}$) 296-1 may be provided to the outbound RF cellular data input of the RF section 294 and to the outbound RF WN input of the RF section 294 such that the outbound data is sent to a wireless network device (e.g., WLAN device and/or WPAN device) and to a base station supporting cellular data communications. The same may be done for an outbound cellular voice signal.

As another example, the switching interface network may provide an inbound cellular signal (e.g., voice [V] or data [D]) to one or more connections. For instance, the RF section converts an RF inbound cellular voice signal 302-2 into an inbound cellular voice symbol stream, which may be provided to the baseband processing module 290 and/or to the RF section 294 as an outbound wireless network data symbol stream. The same may be done for an inbound RF cellular data signal 302-1. As can be seen from FIG. 12, numerous couples of the inbound and outbound symbol streams can achieved to by-pass redundant data demodulation and data re-modulation in the baseband processing module 290 when the data modulation schemes are the same and/or to provide the inbound and/or outbound symbol streams to multiple connections simultaneously (e.g., allows a cellular voice conversion to occur and to store it on a WLAN device or allows a cellular voice conversion to occur using a wireless headset).

When the data modulation and data demodulation schemes are not the same between cellular data communications, cellular voice communications, and/or wireless network communications, the baseband processing module 290 may partially data demodulate and partially data remodulate when at least part of the data modulation and data demodulation schemes are the same. For instance, the baseband processing module 290 may be selectively enabled 320 to perform one or more of: a conversion of the inbound cellular symbol stream into a partially converted inbound cellular signal; a conversion of the partially converted inbound cellular signal into the outbound wireless network data symbol stream; a conversion of the inbound wireless network symbol stream into a partially converted inbound wireless network signal; and a conversion of the partially converted inbound wireless network signal into the outbound cellular symbol stream. This will be more fully described with reference to FIG. 13.

Figure 13:
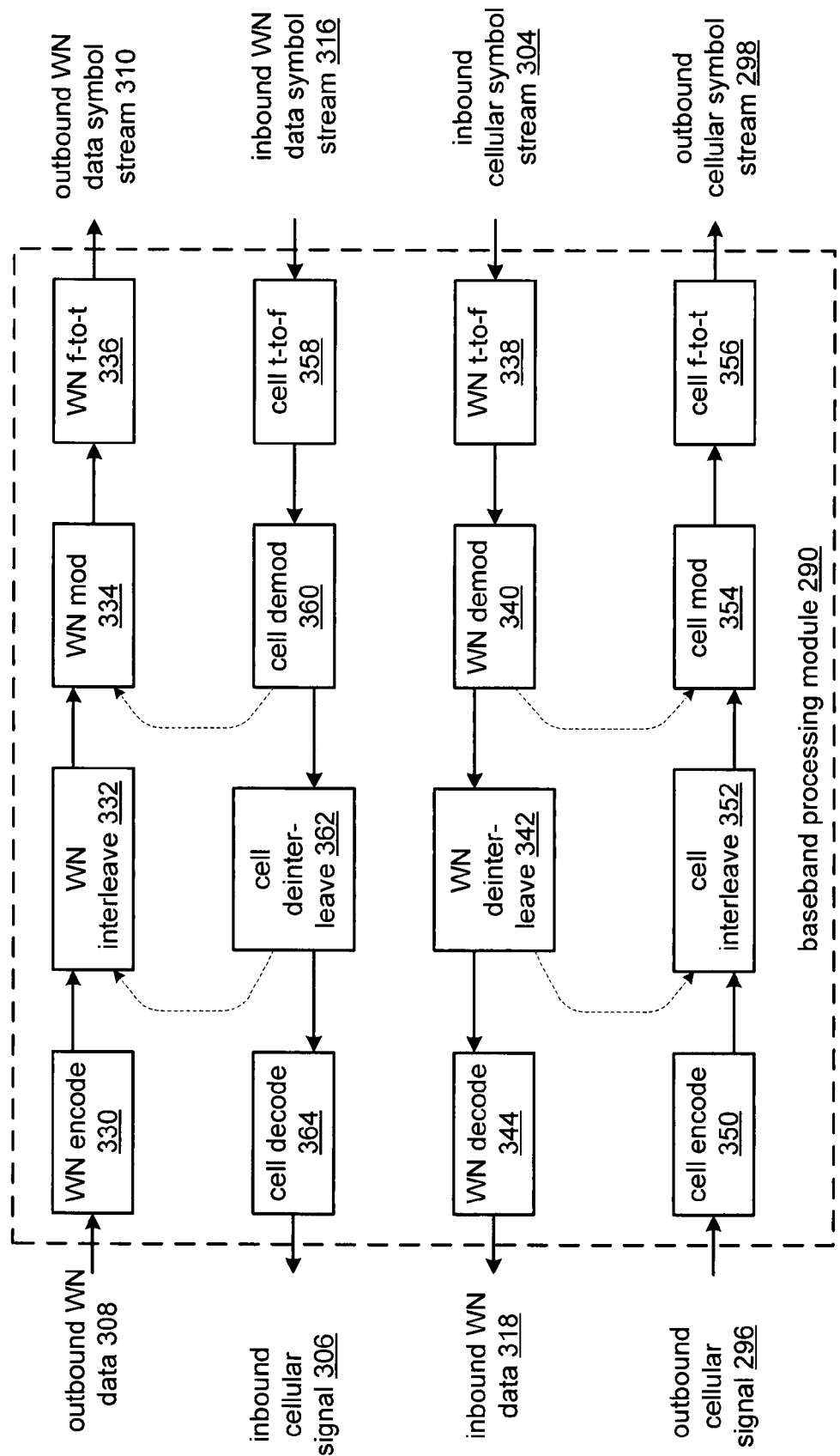
FIG. 13 is a schematic block diagram of an embodiment of a baseband processing module in accordance with the present invention.

FIG. 13 is a schematic block diagram of an embodiment of the baseband processing module 290 that includes a wireless network encoding module 330, a wireless network interleaving module 332, a wireless network modulation module 334, a wireless network frequency-to-time domain conversion module 336, a wireless network time-to-frequency domain conversion module 338, a wireless network demodulation module 340, a wireless network deinterleaving module 342, a wireless network decoding module 344, a cellular encoding module 350, a cellular interleaving module 352, a cellular modulation module 354, a cellular frequency-to-time domain conversion module 356, a cellular time-to-frequency domain conversion module 358, a cellular demodulation module 360, a cellular deinterleaving module 352, and a cellular decoding module 354.

The wireless network encoding module 330, which may be a ½ rate, ⅔ rate, etc. convolutional encoder, a scrambler, a puncture module, and/or any other type of encoder, is coupled to encode the outbound wireless network data 308 to produce encoded outbound wireless network data. The wireless network interleaving module 332 is coupled to interleave words of the encoded outbound wireless network data to produce interleaved outbound wireless network data. The wireless network modulation module 334, which may be a QAM mapping module, an FSK modulator, a QPSK modulator, a BPSK modulator, etc., is coupled to modulate the interleaved outbound wireless network data to produce modulated outbound wireless network symbols. The wireless network frequency to time domain conversion module 336, which may be an inverse fast Fourier transform module and may be omitted depending on the type of modulation, is coupled to convert the modulated outbound wireless network symbols into the outbound wireless network data symbol stream 310.

The wireless network time to frequency domain conversion module 338, which may be a fast Fourier transform module or may be omitted depending on the type of data demodulation, is coupled to convert the inbound wireless network data symbol stream 316 into modulated inbound wireless network symbols. The wireless network demodulation module 340, which may be the compliment of the WN modulation module 334, is coupled to demodulate the modulated inbound wireless network symbols to produce interleaved inbound wireless network data. The wireless network deinterleaving module 342 is coupled to deinterleave the interleaved inbound wireless network data to produce words of encoded inbound wireless network data. The wireless network decoding module 344, which may be the compliment of the WN encoding module 330, is coupled to decode the encoded inbound wireless network data to produce the inbound wireless network data 318.

The cellular encoding module 350, which may be a ½ rate, ⅔ rate, etc. convolutional encoder, a speech encoder, a scrambler, a puncture module, and/or other type of encoder, is coupled to encode the outbound cellular data 296 to produce encoded outbound cellular data. The cellular interleaving module 352 is coupled to interleave words of the encoded outbound cellular data to produce interleaved outbound cellular data. The cellular modulation module 334, which may be a QAM mapping module, an FSK modulator, a QPSK modulator, a BPSK modulator, etc., is coupled to modulate the interleaved outbound cellular data to produce modulated outbound cellular symbols. The cellular frequency to time domain conversion module 336, which may be an inverse fast Fourier transform module and may be omitted depending on the type of modulation, is coupled to convert the modulated outbound cellular symbols into the outbound cellular data symbol stream 298.

The cellular time to frequency domain conversion module 358, which may be a fast Fourier transform module or may be omitted depending on the type of data demodulation, is coupled to convert the inbound cellular data symbol stream 304 into modulated inbound cellular symbols. The cellular demodulation module 360, which may be the compliment of the cellular modulation module 354, is coupled to demodulate the modulated inbound cellular symbols to produce interleaved inbound cellular data. The cellular deinterleaving module 362 is coupled to deinterleave the interleaved inbound cellular data to produce words of encoded inbound cellular data. The cellular decoding module 364, which may be the compliment of the cellular encoding module 350, is coupled to decode the encoded inbound cellular data to produce the inbound cellular data 306.

When the encoding and/or interleaving of the wireless network data is the same as the encoding and/or interleaving of the cellular data, the interleaving and/or encoding steps may be by-passed to produce the partially converted inbound cellular signal and/or the partially converted inbound wireless network signal. For example, when the encoding and interleaving are the same, the output of the cellular demodulation module 360 may be provided to the input of the wireless network modulation module 334 such that an inbound cellular signal is converted into an outbound wireless network signal. Further, with the same encoding and interleaving, the output of the wireless network demodulation module 340 may be provided to the input of the cellular modulation module 354 such that an inbound wireless network signal may be converted to an outbound cellular signal. If the encoding is the same, then the output of the deinterleaving module 362 or 342 is provided to the interleaving module 332 or 352 of the other path. As yet another example, when the encoding is different, each path processes the signals down to the recovered inbound signals and then provides them as the other's outbound data signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. An integrated circuit (IC) comprises:
  a voice baseband processing module coupled to convert an outbound voice signal into an outbound voice symbol stream and to convert an inbound voice symbol stream into an inbound voice signal;
  a data baseband processing module coupled to convert outbound data into an outbound data symbol stream and to convert an inbound data symbol stream into inbound data;
  a wireless network baseband processing module coupled to convert outbound wireless network data into an outbound wireless network data symbol stream and to convert an inbound wireless network data symbol stream into inbound wireless network data;
  a radio frequency (RF) section coupled to:
    convert an inbound RF voice signal into the inbound voice symbol stream;
    convert the outbound voice symbol stream into an outbound RF voice signal;
    convert an inbound RF data signal into the inbound data symbol stream;
    convert the outbound data symbol stream into an outbound RF data signal;
    convert an inbound RF wireless network data signal into the inbound wireless network data symbol stream; and
    convert the outbound wireless network data symbol stream into an outbound RF wireless network data signal; and
  an interface module coupled to:
    convey the inbound voice symbol stream and the outbound voice symbol stream between the voice baseband processing module and the RF section;
    convey the inbound data symbol stream and the outbound data symbol stream between the data baseband processing module and the RF section; and
    convey the inbound wireless network data symbol stream and the outbound wireless network data symbol stream between the wireless network baseband processing module and the RF section.

2. The IC of claim 1, wherein the wireless network baseband processing module is further coupled to convert the outbound wireless network data into the outbound wireless network data symbol stream and to convert the inbound wireless network data symbol stream into the inbound wireless network data in accordance with at least one of a wireless local area network (WLAN) protocol, a wireless personal area network (WPAN), a near field communication protocol, and a far field communication protocol.

3. The IC of claim 1 further comprises:
  a digital signal processor to provide the voice baseband processing module, the data baseband processing module, and the wireless network baseband processing module.

4. The IC of claim 1, wherein the RF section comprises:
  a first antenna interface coupled to a first antenna structure that transceives the inbound and outbound RF voice signals or the inbound and outbound RF data signals in a first frequency band;
  a second antenna interface coupled to a second antenna structure that transceives the inbound and outbound RF wireless network signals in a second frequency band;
  a first low noise amplifier module coupled to amplify the inbound RF voice signal or the inbound RF data signal to produce an amplified inbound RF voice or data signal;
  a first down conversion module coupled to convert the amplified inbound RF voice or data signal into the inbound voice or data symbol stream in accordance with a first local oscillation;
  a first up conversion module coupled to convert the outbound voice symbol stream or the outbound data symbol stream into an up-converted voice or data signal in accordance with the first local oscillation;
  a first power amplifier module coupled to amplify the up-converted voice or data signal to produce the outbound RF voice signal or the outbound RF data signal, wherein the first power amplifier module provides the outbound RF voice or data signal to the first antenna interface;
  a second low noise amplifier module coupled to amplify the inbound RF wireless network signal to produce an amplified inbound RF wireless network signal;

a second down conversion module coupled to convert the amplified inbound RF wireless network signal into the inbound wireless network symbol stream in accordance with a second local oscillation;

a second up conversion module coupled to convert the outbound wireless network symbol stream into an up-converted wireless network signal in accordance with the second local oscillation; and a second power amplifier module coupled to amplify the up-converted wireless network signal to produce the outbound RF wireless network signal, wherein the second power amplifier module provides the outbound RF wireless network signal to the second antenna interface.

5. The IC of claim 4 further comprises:

a bus structure coupling the voice baseband processing module to the wireless network baseband processing module, wherein the voice baseband processing module provides, via the bus structure, the inbound voice signal as the outbound wireless network data to the wireless network baseband processing module and the wireless network baseband processing module provides, via the bus structure, the inbound wireless network data as the outbound voice signal to the voice baseband processing module.

6. The IC of claim 4 further comprises:

a bus structure coupling the data baseband processing module to the wireless network baseband processing module, wherein the data baseband processing module converts the inbound data signal into an inbound converted voice signal and provides, via the bus structure, the inbound converted voice signal as the outbound wireless network data to the wireless network baseband processing module.

7. The IC of claim 6 further comprises:

the wireless network baseband processing module provides, via the bus structure, the inbound wireless network data as the outbound data signal to the data baseband processing module, wherein inbound data signal corresponds to at least one of an email message, a file transfer, a web browsing operation, and a text message.

8. The IC of claim 1, wherein the RF section comprises:

a first antenna interface coupled to a first antenna structure;

a second antenna interface coupled to a second antenna structure, wherein the first antenna structure transceives the inbound and outbound RF voice signals or the inbound and outbound RF data signals in a first frequency band, wherein the second antenna structure transceives the inbound and outbound RF wireless network signals in a second frequency band, wherein the first antenna structure receives at least one of the inbound RF wireless network signal and the outbound RF wireless network signal as a first interferer and the second antenna structure receives at least one of the outbound RF voice or data signal and the inbound RF voice or data signal as a second interferer;

a first low noise amplifier and blocking module coupled to amplify the inbound RF voice signal or the inbound RF data signal and block the first interferer to produce an amplified inbound RF voice or data signal;

a first down conversion module coupled to convert the amplified inbound RF voice or data signal into the inbound voice or data symbol stream in accordance with a first local oscillation;

a second low noise amplifier and blocking module coupled to amplify the inbound RF wireless network signal and block the second interferer to produce an amplified inbound RF wireless network signal; and a second down conversion module coupled to convert the amplified inbound RF wireless network signal into the inbound wireless network symbol stream in accordance with a second local oscillation.

9. The IC of claim 1 further comprises at least one of:

an audio codec coupled to convert an outbound analog voice signal into the outbound voice signal and to convert the inbound voice signal into an inbound analog voice signal;

a data input interface coupled to provide the outbound data to the data baseband processing module;

a display interface coupled to provide the inbound data to an off-IC display device;

a second data input interface providing the outbound data to the display interface;

an advanced high-performance (AHB) bus matrix coupled to the voice, data, and wireless network baseband processing modules;

a microprocessor core coupled to the AHB bus matrix;

a mobile industry processor interface (MIPI) coupled to the AHB bus matrix;

a universal serial bus (USB) interface coupled to the AHB bus matrix;

an external memory interface coupled to the AHB bus matrix;

a secure digital input/output (SDIO) interface coupled to the AHB bus matrix;

an I2S interface coupled to the AHB bus matrix;

a Universal Asynchronous Receiver-Transmitter (UART) interface coupled to the AHB bus matrix;

a Serial Peripheral Interface (SPI) interface coupled to the AHB bus matrix;

a power management interface;

a universal subscriber identity module (USIM) interface coupled to the AHB bus matrix;

a camera interface coupled to the AHB bus matrix;

a pulse code modulation (PCM) interface coupled to the AHB bus matrix; and a video codec coupled to the AHB bus matrix.

10. The IC of claim 1, wherein the voice baseband processing module, the data baseband processing module, the wireless network baseband processing module, and the RF section are further coupled to provide at least one of:

converting the inbound RF voice signal into an outbound wireless personal area network (WPAN) RF voice signal;

converting the inbound RF voice signal into an outbound wireless local area network (WLAN) RF voice signal;

converting the inbound RF voice signal into an inbound analog voice signal;

converting the inbound RF data signal into an outbound WPAN RF data signal;

converting the inbound RF data signal into an outbound WLAN RF data signal;

converting the inbound RF data signal into an inbound data display signal;

converting an outbound RF WPAN signal into an outbound RF voice signal; and converting an outbound RF WPAN signal into an outbound RF WLAN signal.

11. An integrated circuit (IC) comprises:

a voice baseband processing module coupled to convert an outbound voice signal into an outbound voice symbol stream and to convert an inbound voice symbol stream into an inbound voice signal;

a data baseband processing module coupled to convert outbound data into an outbound data symbol stream and to convert an inbound data symbol stream into inbound data;

a wireless network baseband processing module coupled to convert outbound wireless network data into an outbound wireless network data symbol stream and to convert an inbound wireless network data symbol stream into inbound wireless network data;

a first radio frequency (RF) section coupled to:
 convert an inbound RF voice signal into the inbound voice symbol stream;
 convert the outbound voice symbol stream into an outbound RF voice signal;
 convert an inbound RF data signal into the inbound data symbol stream; and
 convert the outbound data symbol stream into an outbound RF data signal;

a second RF section coupled to:
 convert an inbound RF wireless network data signal into the inbound wireless network data symbol stream; and
 convert the outbound wireless network data symbol stream into an outbound RF wireless network data signal;

a first interface module coupled to:
 convey the inbound voice symbol stream and the outbound voice symbol stream between the voice baseband processing module and the first RF section;
 convey the inbound data symbol stream and the outbound data symbol stream between the data baseband processing module and the first RF section; and a second interface module convey the inbound wireless network data symbol stream and the outbound wireless network data symbol stream between the wireless network baseband processing module and the second RF section.

12. The IC of claim 11, wherein the wireless network baseband processing module is further coupled to convert the outbound wireless network data into the outbound wireless network data symbol stream and to convert the inbound wireless network data symbol stream into the inbound wireless network data in accordance with at least one of a wireless local area network (WLAN) protocol, a wireless personal area network (WPAN), a near field communication protocol, and a far field communication protocol.

13. The IC of claim 11, wherein the first RF section comprises:
 a first antenna interface coupled to a first antenna structure that transceives the inbound and outbound RF voice signals in a first frequency band;
 a second antenna interface coupled to a second antenna structure that transceives the inbound and outbound RF data signals in a second frequency band;
 a first low noise amplifier module coupled to amplify the inbound RF voice signal to produce an amplified inbound RF voice signal;
 a first down conversion module coupled to convert the amplified inbound RF voice signal into the inbound voice symbol stream in accordance with a first local oscillation;
 a first up conversion module coupled to convert the outbound voice symbol stream into an up-converted voice signal in accordance with the first local oscillation;
 a first power amplifier module coupled to amplify the up-converted voice signal to produce the outbound RF voice signal wherein the first power amplifier module provides the outbound RF voice signal to the first antenna interface;
 a second low noise amplifier module coupled to amplify the inbound RF data signal to produce an amplified inbound RF data signal;
 a second down conversion module coupled to convert the amplified inbound RF data signal into the inbound data symbol stream in accordance with a second local oscillation;
 a second up conversion module coupled to convert the outbound data symbol stream into an up-converted data signal in accordance with the second local oscillation; and
 a second power amplifier module coupled to amplify the up-converted data signal to produce the outbound RF data signal, wherein the second power amplifier module provides the outbound RF data signal to the second antenna interface.

14. The IC of claim 11, wherein the first RF section comprises:
 a first antenna interface coupled to a first antenna structure;
 a second antenna interface coupled to a second antenna structure, wherein the first antenna structure transceives the inbound and outbound RF voice signals in a first frequency band, wherein the second antenna structure transceives the inbound and outbound RF data signals in a second frequency band, wherein the first antenna structure receives at least one of the inbound RF data signal and the outbound RF data signal as a first interferer and the second antenna structure receives at least one of the outbound RF voice signal and the inbound RF voice signal as a second interferer;
 a first low noise amplifier and blocking module coupled to amplify the inbound RF voice signal and block the first interferer to produce an amplified inbound RF voice signal;
 a first down conversion module coupled to convert the amplified inbound RF voice signal into the inbound voice symbol stream in accordance with a first local oscillation;
 a second low noise amplifier and blocking module coupled to amplify the inbound RF data signal and block the second interferer to produce an amplified inbound RF data signal; and
 a second down conversion module coupled to convert the amplified inbound RF data signal into the inbound data symbol stream in accordance with a second local oscillation.

15. The IC of claim 11 further comprises at least one of:
 an audio codec coupled to convert an outbound analog voice signal into the outbound voice signal and to convert the inbound voice signal into an inbound analog voice signal;
 a data input interface coupled to provide the outbound data to the data baseband processing module; and
 a display interface coupled to provide the inbound data to an off-IC display device;
 a second data input interface providing the outbound data to the display interface;
 an advanced high-performance (AHB) bus matrix coupled to the voice, data, and wireless network baseband processing modules;
 a microprocessor core coupled to the AHB bus matrix;
 a mobile industry processor interface (MIPI) coupled to the AHB bus matrix;

a universal serial bus (USB) interface coupled to the AHB bus matrix;
an external memory interface coupled to the AHB bus matrix;
a secure digital input/output (SDIO) interface coupled to the AHB bus matrix;
an I2S interface coupled to the AHB bus matrix;
a Universal Asynchronous Receiver-Transmitter (UART) interface coupled to the AHB bus matrix;
a Serial Peripheral Interface (SPI) interface coupled to the AHB bus matrix;
a power management interface;
a universal subscriber identity module (USIM) interface coupled to the AHB bus matrix;
a camera interface coupled to the AHB bus matrix;
a pulse code modulation (PCM) interface coupled to the AHB bus matrix; and
a video codec coupled to the AHB bus matrix.

16. The IC of claim 11, wherein the voice baseband processing module, the data baseband processing module, the wireless network baseband processing module, the first RF section, and the second RF section are further coupled to provide at least one of:
converting the inbound RF voice signal into an outbound wireless personal area network (WPAN) RF voice signal;
converting the inbound RF voice signal into an outbound wireless local area network (WLAN) RF voice signal;
converting the inbound RF voice signal into an inbound analog voice signal;
converting the inbound RF data signal into an outbound WPAN RF data signal;
converting the inbound RF data signal into an outbound WLAN RF data signal;
converting the inbound RF data signal into an inbound data display signal;
converting an outbound RF WPAN signal into an outbound RF voice signal; and
converting an outbound RF WPAN signal into an outbound RF WLAN signal.

17. An integrated circuit (IC) comprises:
a baseband processing module selectively enabled to perform one or more of:
a conversion of an outbound cellular signal into an outbound cellular symbol stream;
a conversion of an inbound cellular symbol stream into an inbound cellular signal;
a conversion of outbound wireless network data into an outbound wireless network data symbol stream; and
a conversion of an inbound wireless network data symbol stream into inbound wireless network data;
a radio frequency (RF) section coupled to:
convert an inbound RF cellular signal into the inbound cellular symbol stream;
convert the outbound cellular symbol stream into an outbound RF cellular signal;
convert an inbound RF wireless network data signal into the inbound wireless network data symbol stream; and
convert the outbound wireless network data symbol stream into an outbound RF wireless network data signal; and
a switching interface network selectively enabled to perform selective operation of each of:
coupling the inbound cellular symbol stream to the baseband processing module;
coupling the inbound cellular symbol stream to the RF section as the outbound wireless network data symbol stream;
coupling the inbound wireless network data symbol stream to the baseband processing module;
coupling the inbound wireless network data symbol stream to the RF section as the outbound cellular symbol stream.

18. The IC of claim 17, wherein the baseband processing module is further selectively enabled to perform one or more of:
a conversion of the inbound cellular symbol stream into a partially converted inbound cellular signal;
a conversion of the partially converted inbound cellular signal into the outbound wireless network data symbol stream;
a conversion of the inbound wireless network symbol stream into a partially converted inbound wireless network signal; and
a conversion of the partially converted inbound wireless network signal into the outbound cellular symbol stream.

19. The IC of claim 18, wherein the baseband processing module comprises:
wireless network encoding module coupled to encode the outbound wireless network data to produce encoded outbound wireless network data;
wireless network interleaving module coupled to interleave the encoded outbound wireless network data to produce interleaved outbound wireless network data;
wireless network modulation module coupled to modulate the interleaved outbound wireless network data to produce modulated outbound wireless network symbols;
wireless network frequency to time domain conversion module coupled to convert the modulated outbound wireless network symbols into the outbound wireless network data symbol stream;
wireless network time to frequency domain conversion module coupled to convert the inbound wireless network data symbol stream into modulated inbound wireless network symbols;
wireless network demodulation module coupled to demodulate the modulated inbound wireless network symbols to produce interleaved inbound wireless network data;
wireless network deinterleaving module coupled to deinterleave the interleaved inbound wireless network data to produce encoded inbound wireless network data;
wireless network decoding module coupled to decode the encoded inbound wireless network data to produce the inbound wireless network data.

20. The IC of claim 19, wherein the baseband processing module comprises:
cellular encoding module coupled to encode the outbound cellular data to produce encoded outbound cellular data;
cellular interleaving module coupled to interleave the encoded outbound cellular data to produce interleaved outbound cellular data;
cellular modulation module coupled to modulate the interleaved outbound cellular data to produce modulated outbound cellular symbols;
cellular frequency to time domain conversion module coupled to convert the modulated outbound cellular symbols into the outbound cellular data symbol stream;
cellular time to frequency domain conversion module coupled to convert the inbound cellular data symbol stream into modulated inbound cellular symbols;

cellular demodulation module coupled to demodulate the modulated inbound cellular symbols to produce interleaved inbound cellular data;

cellular deinterleaving module coupled to deinterleave the interleaved inbound cellular data to produce encoded inbound cellular data; and cellular decoding module coupled to decode the encoded inbound cellular data to produce the inbound cellular data.

21. The IC of claim 20, wherein the baseband processing module further functions to:

convert the inbound cellular symbol stream into a partially converted inbound cellular signal and to convert the partially converted inbound cellular signal into the outbound wireless network data symbol stream by at least one of:

provide the interleaved inbound cellular data as the interleaved outbound wireless network data to the wireless network modulation module; and providing the encoded inbound cellular data as the encoded outbound wireless network data to the wireless network interleaving module; and convert the inbound wireless network symbol stream into a partially converted inbound wireless network signal and to convert the partially converted inbound wireless network signal into the outbound cellular symbol stream by at least one of:

providing the interleaved inbound wireless network data as the interleaved outbound cellular data to the cellular modulation module; and providing the encoded inbound wireless network data as the encoded outbound cellular data to the cellular interleaving module.

22. The IC of claim 17, wherein the switching interface network is further selectively enabled to perform one or more of:

coupling the outbound cellular symbol stream to the RF section for conversion into the outbound RF cellular signal;

coupling the outbound cellular symbol stream to the RF section as the outbound wireless network data symbol stream;

coupling the outbound wireless network data symbol stream to the RF section for conversion into the outbound RF wireless network data signal;

coupling the outbound wireless network data symbol stream to the RF section as the outbound cellular symbol stream.

23. The IC of claim 17, wherein the outbound cellular signal and the inbound cellular signal respectively comprise:

an outbound voice signal and outbound data; and an inbound voice signal and inbound data.

* * * * *